US012785552B2

(12) United States Patent
Adragna

(10) Patent No.: US 12,785,552 B2
(45) Date of Patent: Nov. 3, 2026

(54) DRIVER CIRCUIT FOR A RESONANT CONVERTER, RELATED INTEGRATED CIRCUIT, ELECTRONIC CONVERTER AND METHOD

(71) Applicant: STMicroelectronics International N.V., Geneva (CH)

(72) Inventor: Claudio Adragna, Monza (IT)

(73) Assignee: STMicroelectronics International N.V., Geneva (CH)

( * ) Notice: Subject to any disclaimer, the term of this patent is extended or adjusted under 35 U.S.C. 154(b) by 197 days.

(21) Appl. No.: 18/737,840

(22) Filed: Jun. 7, 2024

(65) Prior Publication Data

US 2024/0421693 A1 Dec. 19, 2024

(30) Foreign Application Priority Data

Jun. 15, 2023 (IT) ........................ 102023000012288

(51) Int. Cl.
*H02M 3/00* (2006.01)
*H02M 3/335* (2006.01)

(52) U.S. Cl.
CPC ......... *H02M 3/01* (2021.05); *H02M 3/33571* (2021.05)

(58) Field of Classification Search
CPC ............................ H02M 3/01; H02M 3/33571
See application file for complete search history.

(56) References Cited

U.S. PATENT DOCUMENTS

| | | | | |
|---|---|---|---|---|
| 8,773,872 B2 | 7/2014 | Adragna | | |
| 11,387,739 B2 | 7/2022 | Adragna | | |
| 2021/0067046 A1 * | 3/2021 | Adragna | ................ | H02M 1/08 |

FOREIGN PATENT DOCUMENTS

| | | | |
|---|---|---|---|
| EP | 2445098 | A1 | 4/2012 |

OTHER PUBLICATIONS

Pinheiro et al., "Self-Sustained Oscillating Resonant Converters Operating Above the Resonant Frequency," IEEE Transactions on Power Electronics, vol. 14, No. 5, Sep. 1999, pp. 803-814.

* cited by examiner

*Primary Examiner* — Harry R Behm
(74) *Attorney, Agent, or Firm* — Seed Intellectual Property Law Group LLP

(57) ABSTRACT

A driver circuit for a resonant converter includes an analog zero current comparator configured to generate a first control signal indicating when a resonant current of the resonant converter changes sign, a triangular wave generator circuit configured to provide at output a triangular signal, and a comparison circuit configured to generate a second control signal indicating whether the triangular signal reaches a reference threshold. The driver circuit is configured to drive a high-side and a low-side electronic switch via respective drive signals during a first and a second consecutive switching semi-period, wherein each of the first and the second switching semi-period ends when the comparison circuit indicates that the triangular signal has reached the reference threshold.

20 Claims, 8 Drawing Sheets

DRIVER CIRCUIT FOR A RESONANT CONVERTER, RELATED INTEGRATED CIRCUIT, ELECTRONIC CONVERTER AND METHOD

BACKGROUND

Technical Field

The embodiments of the present description refer to a control device of a switching resonant converter.

Description of the Related Art

Resonant converters are a wide range of switching converters characterized by the presence of a resonant circuit playing an active role in determining the input-output power flow. Considering the most common implementations, in these converters, a full-bridge (or half bridge) consisting of four (or two) power switches (typically power Field Effect Transistors, FET, such as Metal-Oxide-Semiconductor Field-Effect Transistors, MOSFET), supplied by a direct voltage generates a voltage square wave that is applied to a resonant circuit tuned to a frequency close to the fundamental frequency of the square wave. Thereby, because of the selective features thereof, the resonant circuit mainly responds to the fundamental component and negligibly to the higher-order harmonics of the square wave.

As a result, the circulating power may be modulated by changing the frequency of the square wave, while holding the duty cycle constant at 50%. Moreover, depending on the resonant circuit configuration, the currents and/or voltages associated with the power flow have a sinusoidal or a piecewise sinusoidal shape.

These voltages are rectified and filtered so as to provide DC power to a load. In offline applications, to comply with safety regulations, the rectification and filtering system supplying the load is coupled often to the resonant circuit by a transformer providing the isolation between source and load, called for by the above-mentioned regulations. As in all isolated network converters, also in this case a distinction is made between a primary side (as related to the primary winding of the transformer) connected to the input source and a secondary side (as related to the secondary winding(s) of the transformer) providing power to the load through the rectification and filtering system.

Presently, among the many types of resonant converters, the so-called LLC resonant converter is widely used, especially in the half bridge version thereof. The designation LLC comes from the resonant circuit employing two inductors (L) and a capacitor (C).

FIG. 1 shows an example of an LLC resonant converter 20. In general, an electronic converter 20 includes:

- a positive input terminal 200*a* and a negative input terminal 200*b* for receiving a DC input voltage Vin; and
- a positive output terminal 202*a* and a negative output terminal 202*b* for providing a regulated (DC) output voltage Vout or output current Iout.

For example, the input voltage Vin may be provided by a DC voltage generator 10, such as a battery. However, the input voltage Vin may also be obtained from an AC voltage, for instance, by means of a rectifier circuit, such as a bridge rectifier, and an optional filter circuit, such as a capacitor. Conversely, the regulated output voltage Vout or output current Iout may be used to supply a load 30.

In the example considered, the electronic converter 20 includes a half bridge including two electronic switches SW1 and SW2, such as FET, such as n-channel FET, for instance, NMOS, connected (for instance, directly) in series between the input terminals 200*a* and 200*b*, wherein the negative input terminal 200*b* usually represents a first ground GND1. For example, in the example considered, the drain terminal of the transistor SW1 is connected directly to the terminal 200*a*, the source terminal of the transistor SW1 is connected directly to the drain terminal of the transistor SW2 and the source terminal of the transistor SW2 is connected directly to the terminal 200*b*.

Accordingly, the half-bridge SW1, SW2 is supplied via the input voltage Vin and the intermediate node between the electronic switches SW1 and SW2 (for instance, the drain terminal of the transistor SW1) represents a switching node HB.

In the example considered, the control terminals, for instance, the gate terminals of respective FETs, of the electronic switches SW1 and SW2 are driven via a driver circuit 210, which is configured to generate respective drive signals HSGD and LSGD for the electronic switches SW1 and SW2.

Typically, the driver circuit 210 is configured to generate the drive signals HSGD and LSGD in order to repeat the following four phases for each switching cycle:

- during a first time-interval, closing the first electronic switch SW1 and opening the second electronic switch SW2, whereby the switching node HB is connected to the positive input node 200*a*, i.e., the input voltage Vin;
- during a second time-interval, opening both the first and the second electronic switch SW1/SW2;
- during a third time-interval, opening the first electronic switch SW1 and closing the second electronic switch SW2, whereby the switching node HB is connected to the negative input node 200*a*, for instance, ground GND1; and
- during a fourth time-interval, opening both the first and the second electronic switch SW1/SW2.

In the example considered, the switching node HB between the electronic switches SW1 and SW2 is connected to a (resonant) circuit block.

Specifically, in the example considered, this circuit includes a transformer T including a primary winding T1 and a central tapped secondary winding including a first secondary winding T2*a* and a second secondary winding T2*b* connected in series.

In the example considered, the primary winding T1 of the transformer T is connected (for instance, directly) with a capacitor Cr and a first inductance Ls between the switching node HB and the negative terminal 200*b*. Moreover, a second inductance Lp is connected (for instance, directly) in parallel with the primary winding T1. Thus, in the example considered the capacitor Cr, the first inductance Ls and the second inductance Lp are connected in series (from which derives the naming LLC converter), and the inductance Lp is connected in parallel to the primary winding T1. For example, in FIG. 1, a first terminal of the capacitor Cr is connected (for instance, directly) to the switching node HB, a second terminal of the capacitor Cr is connected (for instance, directly) via the inductance Ls to a first terminal of the primary winding T1 and a second terminal of the primary winding T1 is connected (for instance, directly) to the terminal 200*b*.

In a real transformer T, anyway, the two windings T1 and T2 are not perfectly coupled, and a transformed T includes also a leakage inductance and a magnetizing inductance. Substantially, such a leakage inductance may be modelled via an inductance connected in series with the primary winding T1. Conversely, the magnetizing inductance of the transform T (used to model the magnetic flux) may be modelled with an inductance connected in parallel with the primary winding T1. Thus, the inductance Ls may consist in the leakage inductance of the transformer T, may be implemented with an inductor connected in series with the primary winding T1, or may result from both the leakage inductance of the transformer T and such an inductor. Similarly, the inductance Lp may consist in the magnetizing inductance of the transformer T, may be implemented with an inductor connected in parallel with the primary winding T1, or may result from both the magnetizing inductance of the transformer T and such an inductor.

As mentioned before, in FIG. 1 is used a center-tap arrangement on the secondary side, i.e., the secondary winding includes a first, a second and a center-tap terminal. Specifically, in the example considered, the center-tap terminal is connected (for instance, directly) to one of the output terminals 202*a*/202*b*, and the first and second terminal of the secondary winding T2 are connected (for instance, directly) via a respective diode D1 and D2 to the other output terminal 202*a*/202*b*. For example, in the example considered, the center-tap terminal is connected (for instance, directly) to the output terminals 202*b*, and the first and second terminal of the secondary winding T2 are connected (for instance, directly) to the anodes of respective diodes D1 and D2 and the cathodes of the diodes D1 and D2 are connected (for instance, directly) to the terminal 202*a*. Accordingly, due to the rectification function of the diodes D1 and D2, the terminal 202*a* corresponds to the positive output terminal and the terminal 202*b* corresponds to the negative output terminal, which usually corresponds to a second ground GND2. However, by inverting the orientation of the diodes D1 and D2, the terminal 202*b* would correspond to the positive output terminal.

In general, also other rectifiers (instead of the diodes D1 and D2) may be used between the secondary winding T2 and the output terminals 202*a* and 202*b*. For example, the first and second terminal of the secondary winding T2 (which thus may also not include a center-tap terminal) may be connected to the output terminals 202*a* and 202*b* via a bridge rectifier.

Often, the electronic converter 20 may also include an output filter connected between the rectifier and the output terminals 202*a* and 202*b*. For example, in FIG. 1 a capacitor Cout is connected (for instance, directly) between the output terminals 202*a* and 202*b*.

Resonant converters offer considerable advantages as compared to the traditional switching converters (non-resonant converters, typically PWM—Pulse Width Modulation—controlled), such as waveforms without steep edges, low switching losses in the power switches due to the "soft" switching thereof, high conversion efficiency (>95% is usually reachable), ability to operate at high frequencies, low EMI (Electro Magnetic Interference) generation, and/or high power density (i.e., enabling to build conversion systems capable of handling considerable power levels in a relatively small space).

Thus, in the example considered, the electronic converter provides via the output terminals 202*a* and 202*b* a voltage Vout and a current Iout. Often a closed-loop (usually implemented with a negative-feedback control system) keeps either the output voltage Vout or the output current Iout of the converter constant upon changing the operating conditions, for instance, variation of the input voltage Vin and/or the output load 30.

For example, FIG. 2 shows an example of a control circuit for regulating the output voltage Vout in a generic half-bride resonant converter 20.

As mentioned before, a half-bridge resonant converter 20 includes a half-bridge including two electronic switches connected in series between the input terminals 200*a* and 200*b* of the electronic converter 20. Moreover, the converter 20 includes a circuit 204 including a resonant tank (for instance, capacitor Cr, inductances Ls and Lp, and transformer T), a rectifier circuit (for instance, diodes D1 and D2) and an optional filter circuit (for instance, capacitor Cout). Specifically, the circuit 204 is connected on one side to the switching node HB (between the electronic switches SW1 and SW2) and the negative input terminal 200*b* (or alternatively the positive input terminal 200*a*) in order to receive a substantially square wave signal, and on the other side to the output terminals 202*a* and 202*b* in order to provide a regulated output voltage Vout or output current Iout.

Specifically, in order to implement a closed loop control, the converter 20 includes a sensor configured to monitor a value indicative of the output voltage Vout (for a voltage source) or the output current Iout (for a current source). For example, in FIG. 2, the converter 20 is configured to provide a regulated voltage. Accordingly, in the embodiment considered, the converter 20 includes a voltage sensor 212 configured to monitor the output voltage Vout. For example, in FIG. 2 is used a voltage divider including two resistors R1 and R2 connected between the terminals 202*a* and 202*b*, whereby the voltage sensor provides a measurement signal proportional to the output voltage Vout. Conversely, in case of a regulated current source, the converter would include a sensor configured to monitor the output current Iout, such as a shunt resistor connected in series with the load 30.

The measurement signal (indicative of the current Iout or voltage Vout) provided by the sensor 212 is provided to an error amplifier configured to generate an error signal Er. For example, the error amplifier may compare the measurement signal with a reference signal, such as a reference voltage Vref, and generate an error signal Er indicative of the difference between the measurement signal and the reference voltage Vref.

In the example considered, the error signal Er is then provided to the driver circuit 210 in order to modify a given control quantity x, wherein the energy transferred during each switching cycle substantially depends on the control quantity x. Generally, the error signal Er may be provided directly to the driver circuit 210 or indirectly, for instance, via an optocoupler 218 (which is usually used in case of isolated electronic converters). Moreover, the error signal Er or a signal indicative of (for instance, proportional to) the error signal Er (for instance, in case an optocoupler 218 is also used) provided to the driver circuit 210 may be any suitable control signal, such as a voltage Vc or a current Ic. Without loss of generality, in the following it will be assumed that the quantity x is modified as a function of a control current Ic. Moreover, although the current Ic is mainly indicated as being representative of the output voltage Vout of the converter, the current Ic may be representative also of the output current Iout.

Often, the error amplifier is implemented with an operational amplifier 214 receiving at input the measurement signal (for instance, at the inverting/negative input) and the reference signal (for instance, at the non-inverting/positive input). Moreover, the operation amplifier 214 has associated a feedback network 216 connected between the output of the operation amplifier and one of the input terminals (usually the inverting input terminal). For example, the feedback network 216 may include components for implementing the error amplifier as a regulator having a proportional (P) component (for instance, via a resistor) and/or an integrative (I) component (for instance, via a capacitor). Thus, in general, the feedback network 216 implements a filter of the error amplifier. For example, such a filter 216 may be useful in order to select an appropriate frequency response of the error amplifier, for instance, in order to ensure:

- a stable control loop (i.e., that, upon disturbances of the operating conditions of the converter, once the transient caused by the disturbance has subsided, the output parameter Vout/Iout tends to recover a constant steady state;
- a good regulation (i.e., the new constant value recovered by the output parameter Vout/Iout following a disturbance is very close to that preceding the perturbation); and
- a good dynamic performance (i.e., during the transient following a disturbance, the output parameter Vout/Iout does not excessively deviate from the desired value and the transient itself is short).

The above-mentioned control objectives may be expressed in terms of some characteristic quantities of the transfer function of the control loop, such as the band width, the phase margin, the dc gain. For example, in a DC-DC converter, these objectives may be achieved by modifying the feedback network 216 in order to:

- modify on the frequency response of the error amplifier, modifying the gain thereof, and
- conveniently placing the poles and zeroes of the transfer function thereof (frequency compensation).

As mentioned before, this is often achieved by using a passive feedback network 216 including one or more resistances and/or one or more capacitors of appropriate value.

However, in order to determine the frequency compensation called for to obtain the desired features of the transfer function of the control loop, it is beneficial to know both the modulator gain, i.e., the gain of the system converting the control current Ic into the control quantity x, and the frequency response of the converter itself to the variations of the control quantity x.

The inventor has observed that the modulator gain usually does not depend on the switching frequency (at least within the range of the relevant frequencies), and is fixed inside the driver circuit 210. Moreover, although DC-DC converters are strongly non-linear systems (because of the switching action), with suitable approximations and under certain assumptions, their frequency response may be described and represented by a transfer function characterized by gain, zeroes and poles. This transfer function essentially depends on the converter topology, i.e., the mutual configuration of the elements handling the power, on its operation mode, i.e., whether, in a switching cycle, there is a continuous current circulation in the magnetic part (Continuous Current Mode, CCM) or not (Discontinuous Current Mode, DCM), and on the control quantity x controlled by the control loop.

For example, in resonant converters, the control quantity x used to control the converter is often directly the switching frequency of the square wave applied to the resonant circuit (Direct Frequency Control, DFC).

Such a simple control method may suffer from a dynamic behavior characterized by a strongly variable DC gain, and a number of poles varying from one to three and with a very mobile position, depending on the operating point. Additionally, the energy transfer strongly depends on the input voltage Vin (resulting for instance, in a poor audio-susceptibility), so that the control loop has to significantly change the operating frequency to compensate such variations, which are hardly unavoidable in converters operated from the power line (insofar as the input voltage Vin may vary due to the variations of the rectified mains voltage), thus implying the need of a high open-loop gain in the relevant frequency range.

All these characteristics make it practically impossible to obtain a dynamic behavior optimized under all operating conditions, and a considerable trade-off between stability, dynamic performance and input ripple rejection is called for.

The inventor has observed that a possible remedy to these shortcomings consists of using a driver circuit 210 including a control module 220 implementing a control technique known as "Time-shift control" (TSC). The literature teaches that the dynamics of a TSC-controlled converter is that of a low-Q second-order system, i.e., featuring a pair of real poles well separated from one another (at least 5 times). In practice this means that it is possible to achieve excellent dynamic performance with little trade-off against other constraints and with significantly less design effort.

For example, U.S. Pat. No. 8,773,872 B2 discloses two TSC implementations.

In the first implementation (as shown in FIG. 4 of U.S. Pat. No. 8,773,872 B2), TSC is achieved by:

1. alternately charging and discharging a capacitor with a constant current between two voltage levels in the time intervals of a switching cycle when the voltage applied to the resonant tank and the current flowing through it have equal sign,
2. keeping the capacitor voltage constant in the time intervals of a switching cycle when tank voltage and current have opposite sign
3. toggling the half bridge and reversing the charge/discharge phases of the capacitor when the capacitor voltage touches either of the aforementioned voltage levels.

In the second implementation (as shown in FIG. 6 or 9 of U.S. Pat. No. 8,773,872 B2), TSC is achieved by:

1. charging a capacitor with a constant current up to a voltage level in the time interval of a switching half-cycle when the voltage applied to the resonant tank and the current flowing through it have equal sign,
2. keeping the capacitor voltage constant in the time interval of a switching half-cycle when tank voltage and current have opposite sign
3. toggling the half bridge and resetting the capacitor (typically at zero) when the capacitor voltage touches the aforementioned voltage level.

In both implementations, the constant current used to charge (and discharge too in the first implementation) the capacitor is proportional to the control current Ic. Moreover, in both implementations the control module 220 monitors also the current Is flowing from the half-bridge SW1/SW2 into the resonant tank. For example, as mentioned before, the resonant tank may be connected between the switching node HB and the negative terminal 200*b* (or alternatively the positive terminal 200*a*). In this case, a current sensor 222 may be connected in series with the resonant tank. For example, the current sensor 222 may be a shunt resistor (for instance, connected between the resonant tank and the terminal 200*b*, for instance, between the primary winding T1 of the transformer T and the terminal 200*b*) providing a voltage Vs indicative of (for instance, proportional to) the current Is flowing through the resonant tank. Specifically, document U.S. Pat. No. 8,773,872 B2 uses a zero-current comparator in order to detect the sign of the current Is in the resonant tank. For example, in document U.S. Pat. No.

8,773,872 B2 is used a comparator (reference sign CO1 in document U.S. Pat. No. 8,773,872 B2) referred to zero/ground, which receives a voltage Vs proportional to the instantaneous tank current.

The inventor has observed that these implementations tend to make the resonant current Is asymmetrical at light (small) load. Specifically, the inventor has observed that this asymmetry may derive from the input voltage offset of the zero-current comparator, and/or perturbation in the signals, resulting in a duty cycle of the square wave at the node HB different from the ideal 50%. This is due to a cumulative effect: any perturbation or asymmetry in the zero-current instant in a cycle propagates in the following cycles keeping its positive sign, in a sort of "positive feedback loop." If the equivalent gain of this positive loop exceeds unity, the loop becomes unstable and makes the duty cycle diverge from the ideal 50%. The worst consequence of that is an unequal distribution of the secondary current and, for instance, a resulting unequal thermal rise in the secondary rectifiers (D1 and D2). Another detrimental effect is the increase of the output voltage ripple.

The operating conditions where this instability occurs depend on the characteristics of the resonant tank, for instance, on the values of Cr, Ls, Lp and the turns ratio of the transformer (indicated in FIG. 1 as a:1:1) for an LLC converter. For example, the inventor has observed that this instability occurs normally at very light load (i.e., when the current sense signal Vs is very small and the offset of the zero-current comparator has a significant impact). However, in this case, while not being appreciated, there are usually no significant practical consequences due to the small current Is. Conversely, in some electronic converter, this may occur even at a relatively high load (for instance, at half-load) and in this case the unequal thermal stress might impact on system's reliability. Likewise, the increased output voltage ripple might exceed the maximum specified value.

In this respect, U.S. Pat. No. 11,387,739 B2, whose content is incorporated herein by reference in its entirety, discloses a TSC controller that is less sensitive to the input voltage offset of the zero-current comparator and/or to perturbations that tend to alter the duty cycle of the generated square wave from 50% by using an oscillator with dual slope charge.

For example, in a first implementation disclosed therein (as shown in FIGS. 5, 9, 23 and 24 of U.S. Pat. No. 11,387,739 B2), TSC is achieved by:

1. charging a capacitor with a first constant current in the time interval of a switching half-cycle when the voltage applied to the resonant tank and the current flowing through it have opposite sign,
2. charging a capacitor with a second constant current (for instance, larger than the first constant current) up to a voltage level in the time interval of a switching half-cycle when the voltage applied to the resonant tank and the current flowing through it have equal sign, wherein such second constant current includes a current representative of a feedback loop (Ic of U.S. Pat. No. 11,387,739 B2) that controls the voltage (or current) output of the resonant converter,
3. toggling the half bridge and resetting the capacitor (typically at zero) when the capacitor voltage touches the aforementioned voltage level.

The solution proposed in U.S. Pat. No. 11,387,739 B2 provides for a control law for such current representative of the feedback loop (Ic of U.S. Pat. No. 11,387,739 B2) that is dependent on circuit components (for instance, on $I_z$ and $C_z$ of FIGS. 25 and 26 of U.S. Pat. No. 11,387,739 B2, and even on the capacitor $C_T$ of FIGS. 3 and 5 of U.S. Pat. No. 11,387,739 B2). Thus, the accuracy of such current representative of the feedback loop depends on the dimensioning of the circuit components, and even small mismatches in such dimensioning leads to significant deviations of the value of such current, resulting in additional trimming of the components and larger die sizes.

A first solution not suffering from this problem may be found in "Self-Sustained Oscillating Resonant Converters Operating Above the Resonant Frequency," by H. Pinheiro, P. K. Jain, G. Joós, IEEE Transactions on Power Electronics, Vol. 14, No. 5, September 1999, pages 803-814, that discloses a completely different circuit structure based on controlling the displacement angle between one of the resonant circuit variables, typically the current through the resonant inductor, and the voltage at the output of the inverter. The proposed control technique is implemented with a controller that includes two cascade integrators and that is based on a constant-amplitude sawtooth signal synchronized to a switching frequency, and where the amplitude is kept constant against variations in the switching frequency by a negative feedback loop, resulting overall in high complexity.

BRIEF SUMMARY

Considering the foregoing, some embodiments of the present disclosure provide a simple control device. Specifically, various embodiments relate to a PSC ("Phase-Shift Control") device that receives a current representative of the feedback loop and controls a displacement angle between a current flowing through the resonant circuit and a voltage at the output of the inverter and that, as such, is not (or at least less) dependent on circuit components and on their tolerances. This is obtained by still maintaining a low sensitivity to the input voltage offset of the zero-current comparator and/or to perturbations that tend to alter the duty cycle of the generated square-wave from 50%. Thus, this results in simpler and less critical resonant converters, and in a controller integrated circuit (IC) where trimming of components can be simplified, thus leading to smaller die sizes.

Embodiments moreover concern a related integrated circuit, electronic converter, and method.

The claims form an integral part of the technical teaching of the description provided herein.

As mentioned before, various embodiments of the present disclosure relate to a driver circuit, e.g., integrated in a control IC, for an electronic resonant converter. Such a resonant converter is configured to generate an output voltage or output current at two output terminals from an input voltage applied to a positive and a negative input terminal.

For example, in various embodiments, the electronic converter includes at least one half-bridge including a high-side and a low-side electronic switch connected in series between the positive and the negative input terminals, wherein an intermediate node between the high-side and the low-side electronic switch represents a switching node. Moreover, a resonant tank, rectifier and filter circuit is connected between the switching node and the two output terminals. For example, the resonant tank, rectifier and filter circuit may include a transformer. In this case, a capacitor and a first inductance may be connected in series with the primary winding of the transformer between the switching node and the positive or the negative input terminal. Moreover, a second inductance may be connected in parallel with the primary winding. Finally, a rectifier circuit may be connected between the secondary winding and the two output terminals. In various embodiments, the electronic converter includes further a current sensor configured to generate a signal proportional to the resonant current flowing from the switching node to the resonant tank, rectifier and filter circuit, and a feedback circuit configured to generate a feedback signal determined as a function of the output voltage (for a regulated voltage generator) or the output current (for a regulated current generator).

Accordingly, in various embodiments, the driver circuit includes a first and a second terminal configured to be connected to control terminals of the high-side electronic switch and the low-side electronic switch of the resonant converter in order to drive the high-side electronic switch and the low-side electronic switch via respective drive signals, a third terminal configured to be connected to the current sensor in order to receive the signal proportional to the resonant current flowing from the switching node between the high-side electronic switch and the low-side electronic switch to the resonant tank, rectifier and filter circuit of the resonant converter, and a fourth terminal configured to be connected to the feedback circuit in order to receive the feedback signal determined as a function of the output voltage or the output current.

In various embodiments, the driver circuit includes also an analog zero current comparator configured to generate a first control signal indicating when the resonant current changes sign as a function of the signal received at the third terminal, a triangular wave generator circuit configured to provide at output a triangular signal, and a comparison circuit configured to generate a second control signal indicating whether the triangular signal reaches a reference threshold.

Specifically, in various embodiments, the driver circuit is configured to drive the high-side and the low-side electronic switch via the drive signals during a first and a second consecutive switching semi-period, wherein each of the first and the second switching semi-periods ends when the comparison circuit indicates that the triangular signal has reached the reference threshold. Specifically, for this purpose, once the first switching semi-period is started, the driver circuit opens the low-side electronic switch, and closes the high-side electronic switch after a given first delay. Similarly, once the second switching semi-period is started, the driver circuit opens the high-side electronic switch, and closes the low-side electronic switch after the given second delay. The second delay may correspond to the first delay.

Conversely, the duration of the first and second semi-periods is controlled via the triangular wave generator circuit and the analog comparator. Specifically, in various embodiments, the triangular wave generator circuit is configured to generate the triangular signal in each of the first and the second switching semi-period by:

- in a first interval starting at the instant when the respective semi-period starts and ending at the instant when the first control signal indicates that the resonant current has changed sign, increasing the triangular signal with a first slope, and
- in a second interval starting at the instant when the first control signal indicates that the resonant current has changed sign and ending at the instant when the second control signal indicates that the triangular signal has reached the reference threshold, decreasing the triangular signal with a second slope.

Specifically, in various embodiments, the first slope has a positive value obtained by summing a negative first value to a positive second value, and the second slope has a negative value corresponding to the first negative value, wherein the absolute value of the first value is smaller than the absolute value of the second value and the first value is proportional to the feedback signal.

For example, in various embodiments, the triangular wave generator circuit includes for this purpose an integrator circuit configured to generate the triangular signal by integrating, during the first interval, the sum of the positive second value and the negative first value and, during the second interval, the negative first value.

For example, in case of an analog implementation, the integrator circuit may include an integration capacitor connected to a node, a first current source configured to sink a first current corresponding to the first value from the node, and a second current source configured to source a second current corresponding to the second value to the node, wherein the second current source is enabled during the first interval and the triangular signal corresponds to the voltage at the integration capacitor. For example, in order to indicate the first interval, the driver circuit may be configured to assert a third control signal in response to determining that the second control signal indicates that the triangular signal reaches a reference threshold, and de-assert the third control signal in response to determining that the first control signal indicates that the resonant current changes sign. Accordingly, in this case, the second current source may be enabled when the third control signal is asserted.

Conversely, in a digital implementation, the triangular wave generator circuit may include a bidirectional digital counter configured to, during the first interval, increase a count value with a speed proportional to the sum of the positive second value and the negative first value and, during the second interval, decrease the count value with a speed proportional to the negative first value.

In various embodiments, the reference threshold may not be constant but may correspond to a ramp with a positive slope that starts at the beginning of the first and of the second switching semi-period. Alternatively, the reference threshold may be a ramp with a positive slope that starts after a fixed delay from the beginning of the first and of the second switching semi-period. In both cases, the ramp may be reset at the end of the first and the second switching semi-period. Specifically, in various embodiments, the reference threshold has a slope being greater than the first slope, or the ramp reference threshold has a first slope during the first interval and a second slope during the second interval, wherein the second slope is greater than the first slope, and wherein an average value of the first slope and the second slope of the reference threshold is greater than the first slope of the triangular wave generator circuit.

For example, in order to generate such a ramp reference threshold, the driver circuit may include a threshold generating circuit, which includes a capacitor connected between an output node and a ground node, a current generator configured to apply a current to the output node (thereby charging the capacitor) and a switch connected between the output node and the ground node (thereby selectively discharging the capacitor), wherein the ramp reference threshold corresponds to the voltage at the capacitor. Moreover, the threshold generating circuit may include a control block or circuit configured to generate a control signal indicating a change in the reference signal, and either close the switch when the control signal indicates a change in the reference signal or open the switch when the control signal does not indicate a change in the reference signal.

In one embodiment, a device includes a driver circuit. The driver circuit includes a first terminal configured to output a high-side gate drive signal, a second terminal configured to output a low-side gate drive signal, and a third terminal configured to receive a resonant current signal indicative of a resonant current external to the driver circuit. The driver circuit includes a fourth terminal configured to receive a feedback signal based on an output signal external to the driver circuit, an integrator circuit to generate a triangular integration signal based on the feedback signal, and a control circuit configured to receive the integration signal and the resonant current signal and to generate the high-side gate drive signal and the low-side gate drive signal based on the integration signal and the resonant current signal.

In one embodiment, a method includes driving, with a driver circuit of a resonant converter, a high-side switch of the resonant converter with a high-side gate drive signal and driving, with the driver circuit, a low-side switch of the resonant converter with a low-side gate drive signal. The method includes receiving, with the driver circuit, a resonant current signal indicative of a resonant current in a primary side of the resonant converter, receiving, with the driver circuit, a feedback signal based on an output signal of the resonant converter, generating, with an integrator circuit of the driver circuit, a triangular integration signal based on the feedback signal, and generating, with the driver circuit, the high-side gate drive signal and the low-side gate drive signal based on the integration signal and the resonant current signal.

Solutions as described herein, facilitate obtaining a current representative of the feedback loop that is rather independent of circuit components, leading to less critical resonant converters, and in a controller integrated circuit where trimming of components can be simplified, thus leading to smaller die sizes.

BRIEF DESCRIPTION OF THE SEVERAL VIEWS OF THE DRAWINGS

The features and advantages of the present disclosure will become apparent from the following detailed description of practical embodiments thereof, shown by way of non-limiting example in the accompanying drawings, in which.

Corresponding numerals and symbols in the different figures generally refer to corresponding parts unless otherwise indicated.

DETAILED DESCRIPTION

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is included in at least one embodiment. Hence, phrases such as "in an embodiment," "in one embodiment," or the like that may be present in various points of this description do not necessarily refer to one and the same embodiment. Moreover, particular conformations, structures, or characteristics may be combined in any adequate way in one or more embodiments.

The references used herein are only provided for convenience and hence do not define the sphere of protection or the scope of the embodiments.

Figure 1:
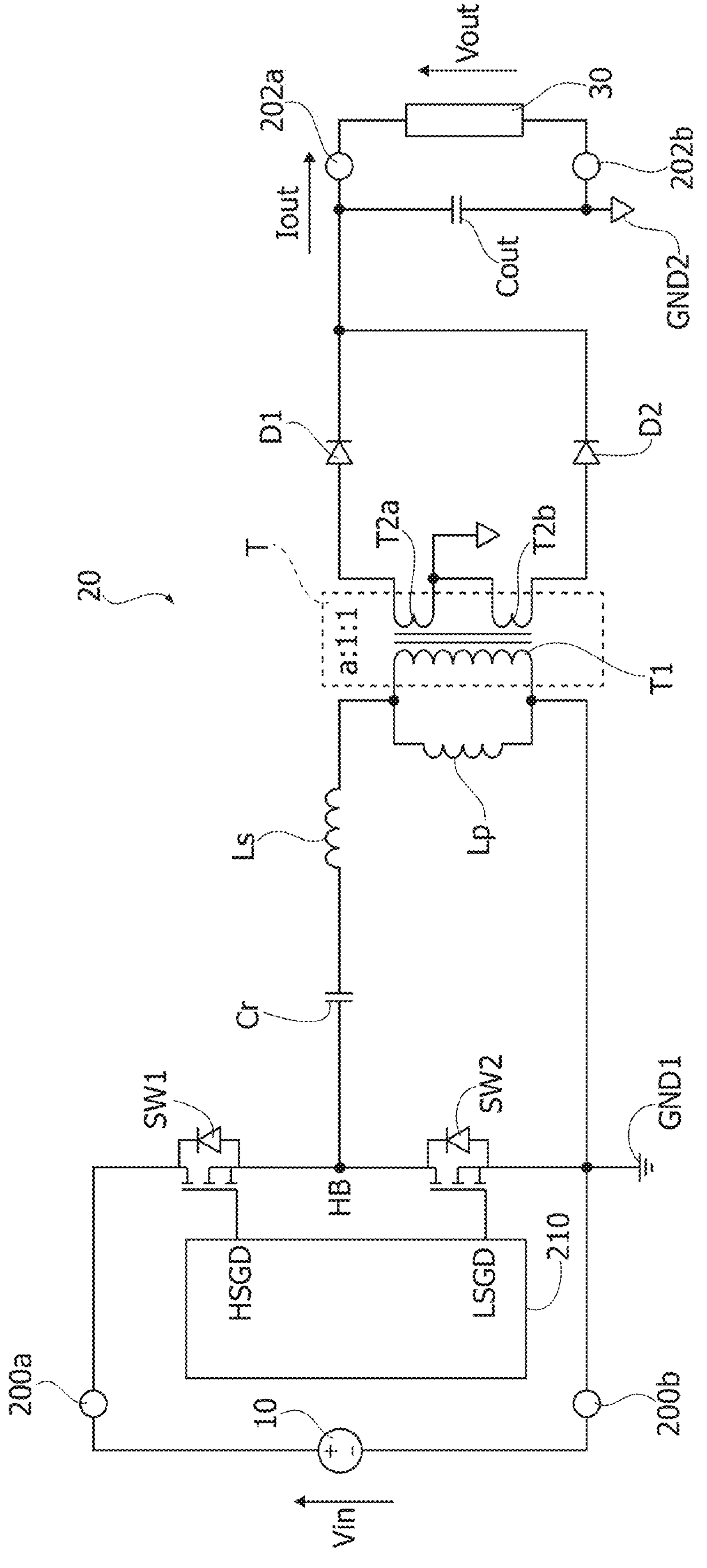
FIG. 1 shows a circuit schematic of an LLC resonant converter in accordance with the prior art.
Figure 2:
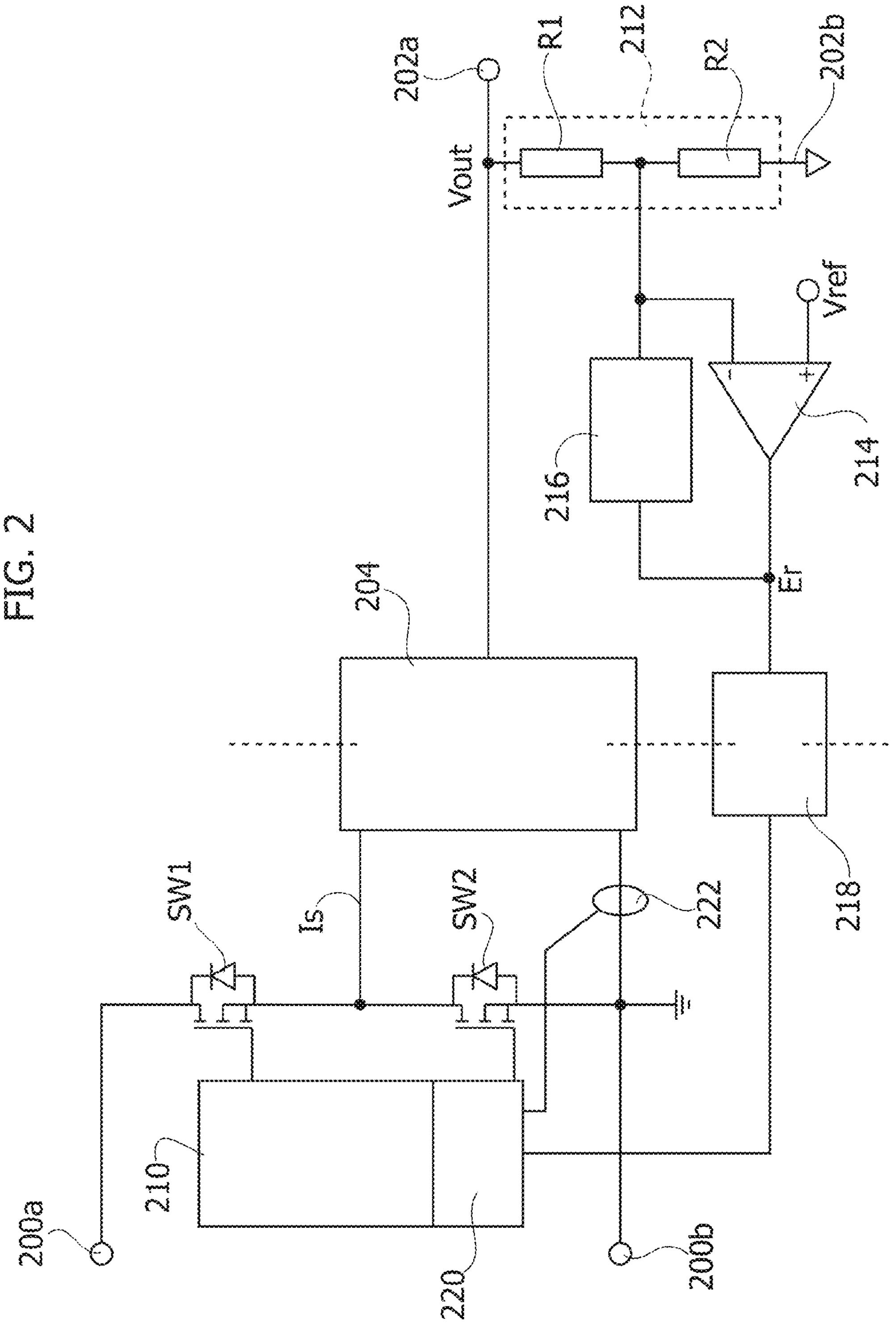
FIG. 2 shows a block diagram of a resonant converter with TSC regulation of the output voltage in accordance with the prior art.

In FIGS. 3 to 7 described below, parts, elements or components that have already been described with reference to FIG. 1 or 2 are designated by the same references used previously in these figures. The description of these elements has already been made and will not be repeated in what follows in order not to burden the present detailed description.

Figure 3:
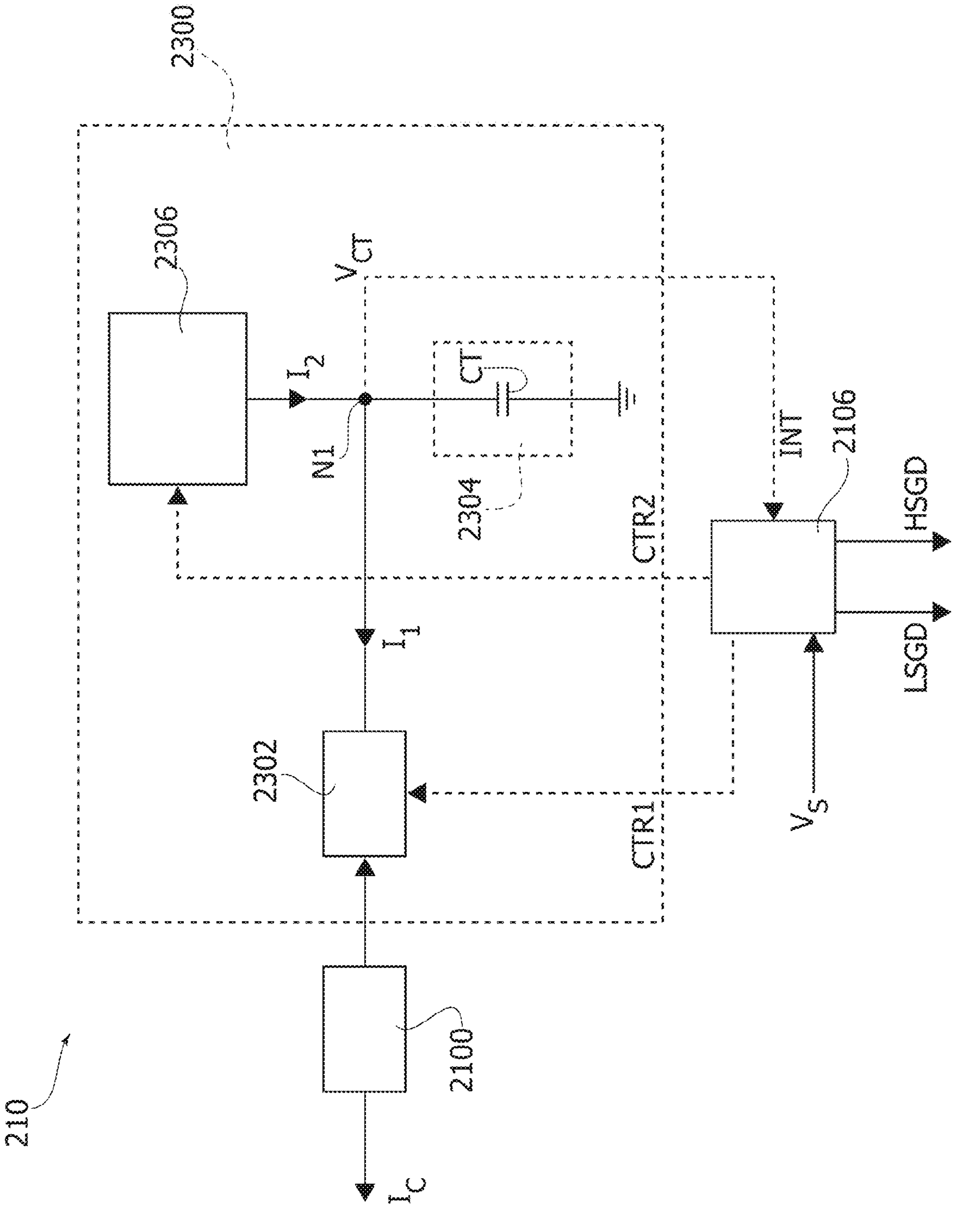
FIG. 3 shows an embodiment of a control device for a resonant converter using a PSC method.

FIG. 3 shows a circuit schematic of a control device 210 for a resonant converter in accordance with an embodiment of the present disclosure.

For example, such a control device 210 may be used to control the operation of an (LLC) electronic converter as shown in FIGS. 1 and 2, and the respective description applies in its entirety.

Thus, in various embodiments, the driver circuit 210 receives a feedback signal, such as a current Ic, determined as a function of the output voltage Vout or output current Iout. For example, in various embodiments, the control signal Ic is determined via a negative feedback control loop of the output voltage (see the description of FIG. 2). For example, when the driver circuit 210 is implemented in an integrated circuit, the driver circuit 210 may receive the feedback signal Ic via a pin of the integrated circuit.

Specifically, in the embodiment considered, the control current Ic is connected to an optional input stage 2100 essentially implementing a power amplifier. For example, document U.S. Pat. No. 11,387,739 B2 discloses with respect to FIG. 8 a possible implementation of such an input stage.

The output signal of the optional input stage 2100, or directly the control current Ic if the optional input stage 2100 is absent, is provided to an integration circuit 2300, and specifically to a first current generator 2302 contained therein.

In the embodiment shown in FIG. 3, the driver circuit includes:

- the integration circuit 2300, that is configured to receive the output signal from the optional input stage 2100, or directly the control current Ic, and to generate an integration signal INT being proportional to the integral of the feedback signal Ic (received directly as input or through the optional input stage 2100, as described previously) during given time periods; and
- a control circuit 2106 configured to control the operation of the integration circuit 2300 via one or more control signals CTR1, CTR2 as a function of the measurement signal Vs (being proportional to the resonant current Is) and the integration signal INT received from such integration circuit 2300.

Moreover, the control circuit 2106 is configured to generate the drive signals HSGD and LSGD for the high-side switch SW1 and the low-side switch SW2, respectively, as a function of the measurement signal Vs and the integration signal INT received from such integration circuit 2300.

For example, in FIG. 3, the integration circuit 2300 includes an analog integrator 2304 including a capacitor CT and a first current generator 2302.

Specifically, in the embodiment considered, the analog integrator 2304 includes an input terminal N1 and the analog integrator 2304 is configured to generate a signal INT proportional to the integral of the current received via the node N1. Specifically, in the embodiment considered, the capacitor CT is connected between the node N1 and a reference voltage, such as ground, and the signal INT corresponds to the voltage $V_{CT}$ at the capacitor CT.

In the embodiment considered, the first current generator 2302 is configured to absorb/sink a current I1 from the node N1, wherein the current I1 is proportional to the feedback signal Ic, for instance, by a factor k. In various embodiments, this operation is done according to a control signal CTR1 received from the control circuit 2106.

In various embodiments, the capacitor CT may be external with respect to the integrated circuit including the driver circuit 210. Accordingly, the node N1 may be connected to a pin of such an integrated circuit. Alternatively, the capacitor CT may be internal and/or integrated within the integrated circuit including the driver circuit 210.

As shown in FIG. 3, in various embodiments, the integration circuit 2300 includes a second current generator 2306. Specifically, this second current generator 2306 provides/sources a second current I2 to the node N1. In various embodiments, this operation is done according to a control signal CTR2 received from the control circuit 2106.

Accordingly, in the embodiment considered, due to the directions of the currents I1 and I2, the analog integrator 2304 receives (and the capacitor CT is charged with) a current corresponding to the difference between the current I2 and I1 (I2–I1).

Specifically, in various embodiments, the first current generator 2302 may be always enabled and provide a current I1 proportional to the current Ic, i.e., in each semi-period TA and TB (see FIG. 5), whereby:

during a first time period between an instant when a respective semi-period TA/TB is started and an instant when the signal Vs indicates that the resonant current Is has changed sign, the capacitor CT receives a (constant) current I2=Io from the second current generator 2306, and, at the same time, is discharged with a current I1 proportional to the current Ic, for instance, I1=k·Ic, by the first current generator 2302; thus, during such time period, when a tank voltage $V_{HB}$ and the current Is have opposite sign, the capacitor CT is charged by a current proportional to I2–I1 (i.e., Io–k·Ic). Hence, to achieve the charging of the capacitor CT, the absolute value of the current I2/Io should be higher/greater than the absolute value of the current I1; and during a second time period between the instant when the signal Vs indicates that the resonant current Is has changed sign and an instant when the respective semi-period TA/TB ends, the capacitor CT is discharged with a current I1 proportional to the current Ic, for instance, I1=k·Ic, by the first current generator 2302, while the second current generator 2306 is turned off (i.e., I2=0), for instance, via the control signal CTR2; thus, during such time period, when the tank voltage $V_{HB}$ and the current Is have equal sign, the capacitor CT is discharged via the current I1 (i.e., k·Ic), i.e., via a current proportional to Ic.

Figure 5:
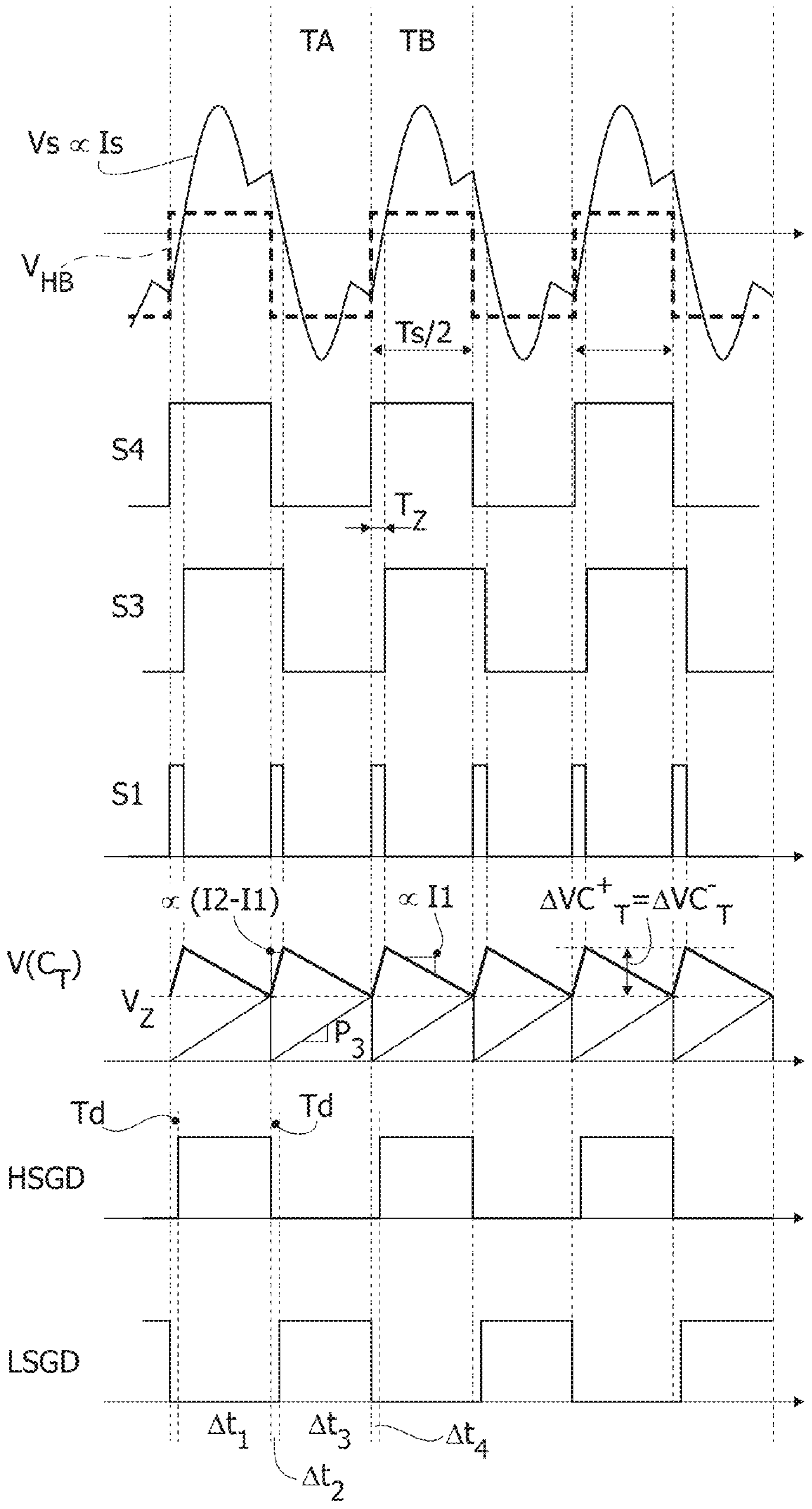
FIG. 5 shows time diagrams of the voltages involved in the device of FIG. 4, according to various embodiments of the present solution.

As shown in FIG. 5, essentially, the embodiment shown in FIG. 3 is configured to charge and discharge the capacitor CT during each semi-period TA and TB generating a voltage $V_{CT}$ having a triangular waveform.

To obtain such triangular waveform in subsequent charging/discharging cycles of the capacitor CT, it may be beneficial to reach a steady state condition. For this purpose, the description in the following can be considered.

As described in the foregoing, in various embodiments, the triangular waveform of the voltage $V_{CT}$ is composed of an ascending/rising ramp and a descending/falling ramp with respective amplitudes $$V_{CT}^{+} \text{ and } \Delta V_{CT}^{+}.$$

The amplitude of the ascending ramp $$\Delta V_{CT}^{+}$$

depends linearly on the charging current I2–I1 and may be expressed as:

$$\Delta V_{CT}^{+} = \frac{1}{CT}(I2 - I1)T_z$$

wherein $T_z$ corresponds to the duration of the time interval between the instant when a respective semi-period TA/TB is started, i.e., when the voltage $V_{CT}$ at the capacitor CT is (substantially) equal to or smaller than a (lower) threshold value $V_z$, for instance, the voltage of the ground GND1 or any other voltage, and the instant when the signal Vs indicates that the resonant current Is has changed sign. For example, as shown in FIG. 5, in various embodiments, the control circuit 2106 may be configured to generate a control signal S1 indicating the interval $T_z$ by:

asserting the signal S1 in response to detecting that the voltage $V_{CT}$ at the capacitor CT is equal to or smaller than the threshold value $V_z$; and de-asserting the signal S1 in response to detecting that the signal Vs indicates that the resonant current Is has changed sign.

Accordingly, at the end of the interval $T_z$, the voltage $V_{CT}$ at the capacitor CT corresponds approximately to $$V_z + \Delta V_{CT}^{+}.$$

Conversely, the amplitude of the descending ramp $$\Delta V_{CT}^{-}$$

depends linearly on the discharging current I1 and may be expressed as:

$$\Delta V_{CT}^{-} = \frac{1}{CT} I1 \left( \frac{T_s}{2} - T_z \right)$$

wherein $T_s$ is the duration of the time interval of the respective period (TA+TB). Accordingly, at the end of the interval $T_s$, the voltage $V_{CT}$ at the capacitor CT corresponds approximately to $V_z$.

Accordingly, in order to reach the steady state condition in subsequent charge/discharge cycles of the capacitor CT, it may be beneficial to satisfy the following condition:

$$\Delta V_{CT}^{+} = \Delta V_{CT}^{-}$$

that leads to the following expression:

$$I1 = I2 \frac{T_z}{T_s/2}$$

The inventor has observed that the term $T_z/T_s$ is proportional to a current-voltage phase shift Φ, i.e.:

$$\Phi = 2\pi \frac{T_z}{T_s}$$

leading to the conditions:

$$I1 = I2 \frac{\Phi}{\pi}$$

and, if I1 is proportional to the current Ic according to the equation I1=k·Ic, $$Ic = \frac{I2}{k} \frac{\Phi}{\pi}$$

that is the condition that may ensure a steady state condition in charging and discharging the capacitor CT in subsequent cycles.

This condition provides for a control law for such current representative of the feedback loop Ic that is (in principle) independent from the circuit components and from their tolerances, favoring the achievement of a desired accuracy of such current representative of the feedback loop Ic that is not affected by the dimensioning of the circuit components, for instance, it is independent from the dimensioning of the capacitor CT and from the lower threshold value $V_z$. In this way, mismatches in the dimensioning of such components do not lead to any deviation of the value of such current Ic, so capacitors and currents matching are not called for, and additional trimming of the components of the control integrated circuit and larger die sizes may be avoided.

Figure 4:
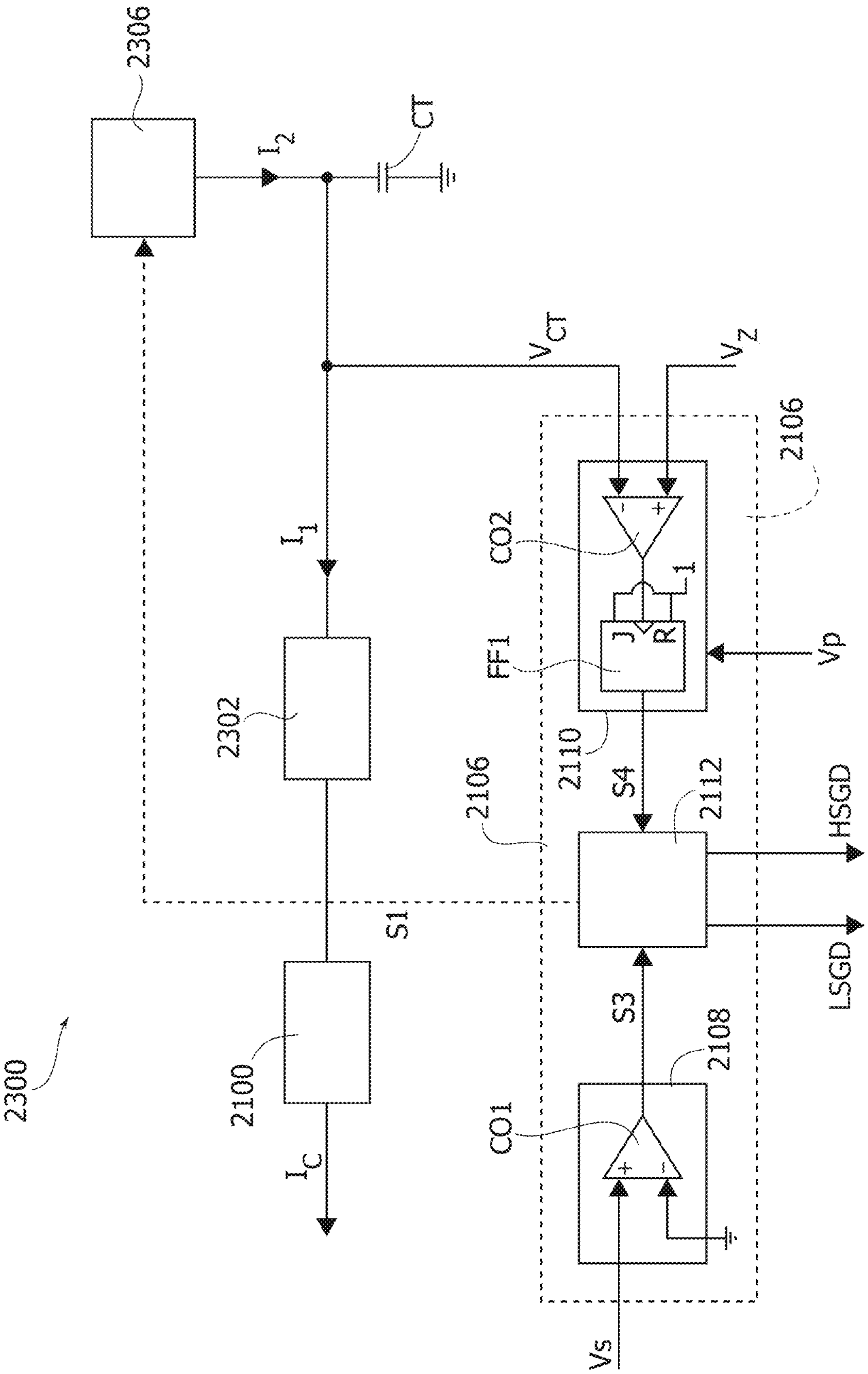
FIG. 4 shows an embodiment of the control device of FIG. 3.

FIG. 4 shows an embodiment of the control device 210 of FIG. 3 in a more detailed way. Specifically, in the embodiment considered, the control circuit 210 includes again a node (such as a pin or pad) N1 configured to be connected via a capacitor CT to a reference voltage. Moreover, the control circuit 210 includes, within the integration circuit 2300, a discharge circuit/first current generator 2302 configured to generate a current I1 proportional to the current Ic, for instance, I1=k·Ic, that is absorbed/sunk from the node N1 (thus, providing a discharge current to the capacitor CT).

Specifically, in various embodiments, the current generator/discharge circuit 2302 is always enabled, i.e., the discharge circuit 2102 is enabled for each semi-period TA and TB. As described in the foregoing, the discharge circuit 2302 may receive the output signal of the optional input stage 2100, or directly the control current Ic if the optional input stage 2100 is absent, and generate a current I1, proportional to the feedback signal Ic.

The second current generator 2306 of FIG. 3 is implemented with a charge circuit/second current generator 2306 providing a current I2=Io to the node N1 (thus, providing a charge current to the capacitor CT). Specifically, in various embodiments, the charge circuit 2306 is only enabled during the interval $T_z$, e.g., the charge circuit 2306 is enabled in response to determining that the signal S1 is asserted and disabled in response to determining that the signal S1 is de-asserted.

Accordingly, in various embodiments the signal CTR1 of FIG. 3 may be omitted and the signal CTR2 corresponds to the signal S1.

As mentioned before, the control signal S1 may be a binary signal that is set, for instance, to a high value, in an interval between the instant when a respective semi-period TA/TB is started, i.e., when the voltage $V_{CT}$ at the capacitor CT is substantially equal to or smaller than the threshold value $V_z$, for instance, the voltage of the ground GND1 or any other voltage, and the instant when the signal Vs indicates that the resonant current Is has changed sign, and is set, for instance, to a low value, in an interval between the instant when the signal Vs indicates that the resonant current Is has changed sign and the instant when the respective semi-period TA/TB ends, i.e., when the voltage $V_{CT}$ at the capacitor CT is substantially equal to or smaller than the same previous lower threshold value $V_z$.

Thus, as shown in FIG. 5, essentially, the embodiment shown in FIG. 4 permits to charge and discharge the capacitor CT during each semi-period TA and TB, thereby generating a voltage $V_{CT}$ having a triangular waveform.

In the embodiments considered, the control circuit 2106 is thus configured to generate the control signal S1, and the drive signals LSGD and HSGD as a function of the voltage $V_{CT}$ at the capacitor CT (at the node N1, corresponding, in various embodiments, to the integration signal INT), the lower threshold value $V_z$, and the measurement signal Vs.

In this regard, the control circuit 2106 may include:

- a first comparator block 2108, configured to receive the measurement signal Vs, and to generate a control signal S3;
- a second comparator block 2110, configured to receive the voltage signal $V_{CT}$ at the capacitor CT and the lower threshold value $V_z$, for instance, the voltage of the ground GND1 or any other voltage, and to generate a control signal S4; and
- a circuit 2112, configured to receive both the control signals S3 and S4, and to generate, according to their values, the control signal S1 and the drive signals LSGD and HSGD.

For example, in various embodiments, the signal Vs, proportional to the resonant current Is, is provided to the first comparator block 2108, which thus generates a binary control signal S3 indicating whether the signal Vs (corresponding to the resonant current Is) is positive or negative. For example, in the embodiment shown in FIG. 4, the circuit 2108 may be implemented with a comparator CO1 receiving at a positive input terminal the voltage Vs, while a negative input terminal is connected to ground, for instance, GND1, and the output of such comparator provides the signal S3. Accordingly, in the embodiment considered, the signal S3 is high when the signal Vs (the resonant current Is) is positive.

Moreover, in the embodiment considered, the control circuit 2106 includes the second comparator block 2110 configured to:

- de-assert/set a binary control signal S4 to a first logic level (for instance, to low) when the voltage $V_{CT}$ reaches the lower threshold $V_z$ and the control signal S4 was previously asserted/set to the other logic level (for instance, to high), and
- assert/set the binary control signal S4 to a second logic level (for instance, to high) when the voltage $V_{CT}$ reaches the lower threshold $V_z$ and the control signal S4 was previously de-asserted/set to the first logic level (for instance, to low).

Accordingly, the control signal S4 indicates the periods TA and TB.

For example, in the embodiment shown in FIG. 4, the circuit 2110 may be implemented with a comparator CO2 receiving at a positive input terminal the voltage $V_z$, while a negative input terminal is connected to the voltage $V_{CT}$ at the capacitor CT, and the output of the comparator CO2 provides a signal used to toggle the output value of a flip-flop FF1, which provides at output the signal S4. For example, in the embodiments considered, the flip-flop FF1 is a JK flip-flop configured to have both J and K inputs connected to the high logic level, and with the output of the comparator CO2 connected to a clock input of the flip-flop FF1.

In various embodiments, the signals S3 and S4 are elaborated by a circuit 2112 in order to generate the control signal S1, and also the drive signals HSGD and LSGD for the switches SW1 and SW2.

Specifically, in the embodiment considered, the charge circuit 2114 is enabled, via the signal S1, when the signal S3 indicates that the resonant current Is is negative, and the signal S4 is set to the high logic level, and such charge circuit 2114 is also enabled, again via the signal S1, when the signal S3 indicates that the resonant current Is is positive, and the signal S4 is set to the low logic level. Conversely, in all the other cases, the charge circuit 2114 is disabled via the signal S1. Accordingly, in various embodiments, the charge circuit 2114 is enabled in response to determining that the signal S1 is asserted and disabled in response to determining that the signal S1 is de-asserted.

Specifically, the driver circuit 210 may generate the drive signals HSGD and LSGD in order to repeat the following four phases for each switching cycle (refer to FIG. 5):

- during a first time-interval Δt1, closing the first electronic switch SW1 and opening the second electronic switch SW2, whereby the switching node HB is connected to the positive input node 200*a*, i.e., the input voltage Vin;
- during a second time-interval Δt2, opening both the first and the second electronic switch SW1/SW2;
- during a third time-interval Δt3, opening the first electronic switch SW1 and closing the second electronic switch SW2, whereby the switching node HB is connected to the negative input node 200*b*, for instance, ground GND1; and
- during a fourth time-interval Δt4, opening both the first and the second electronic switch SW1/SW2.

Accordingly, the semi-period TA corresponds to the second time-interval Δt2 and the third time-interval Δt3 (TA=Δt2+Δt3), and the semi-period TB corresponds to the fourth time-interval Δt4 and the first time-interval Δt1 (TB=Δt4+Δt1). Specifically, in various embodiments, the time-interval Δt2 and the time-interval Δt4 may have the constant duration Td (refer again to FIG. 5).

As mentioned before, the signal S4 already indicates the semi-periods TA and TB, e.g., the signal S4 is asserted during the semi-period TA and de-asserted during the semi-period TB. Accordingly, in various embodiments, the circuit 2106 may be configured to:

- in response to a rising edge of the signal S4, de-assert immediately the signal LSGD and assert the signal HSGD after the delay Δt2=Td; and
- in response to a falling edge of the signal S4, de-assert immediately the signal HSGD and assert the signal LSGD after the delay Δt4=Td.

Figure 6:
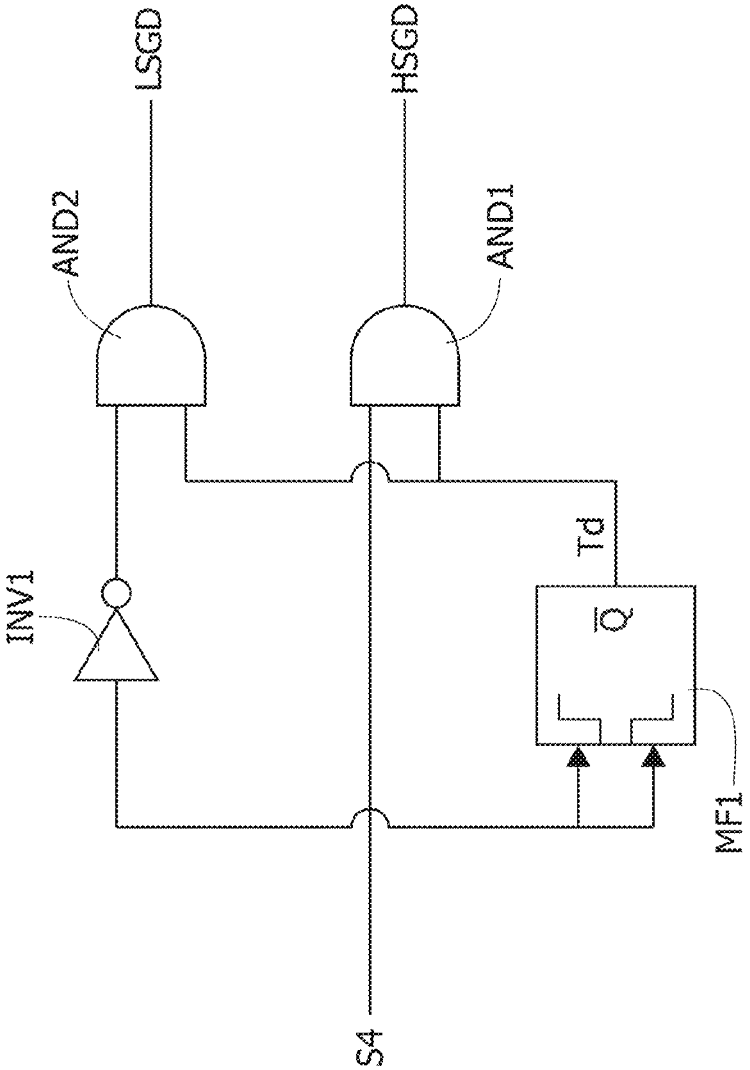
FIGS. 6 and 7 show details of the circuit of FIG. 4.

For example, FIG. 6 shows an embodiment, wherein the signal S4 is also fed to a monostable device MF1. Specifically, the output of the monostable device MF1 is set to high after a delay of Td with respect to each rising or falling edge of the signal S4. The output of the monostable device MF1 and the signal S4 are fed to a logic gate AND1, such as a AND gate, in order to generate the signal HSGD. Moreover, the output of the monostable device MF1 and the inverted version of the signal S4 (as schematically shown via a not gate INV1) are fed to a logic gate AND2, such as a AND gate, in order to generate the signal LSGD. In general, the monostable device MF1 may also be implemented with other delay circuits, such as a delay line.

In parallel, the driver circuit 210 is configured to determine the instants when the intervals TA and TB should end, i.e., when the intervals Δt3 and Δt1 should end.

For example, in the embodiment shown in FIG. 4, the control circuit 2106 may be configured to execute the following steps during the time interval TA:

- once the interval TA is started, e.g., in response to a falling edge of the signal S4, waiting for the signal Vs to indicate that the resonant current Is becomes zero/negative. During this interval both the charge circuit 2114 and the discharge circuit 2102 are enabled, thereby charging the capacitor CT with a current proportional to I2−I1;
- at the instant when the signal Vs indicates that the resonant current Is become negative, disabling the charge circuit 2114 (for instance, via the signal S1), thereby discharging the capacitor CT with a current proportional to I1 (and consequently to Ic), and
- once the integration signal (voltage $V_{CT}$ at the capacitor CT) reaches the threshold value $V_z$, as signaled, e.g., via a rising edge of the signal S4, enabling again the charge circuit 2114 (via the signal S1) and ending the interval TA, thereby ending the interval Δt3 and starting the interval TB.

Conversely, the control circuit 2106 may be configured to execute the following steps during the time interval TB:

- once the interval TB is started, e.g., in response to a rising edge of the signal S4, waiting for the signal Vs to indicate that the resonant current Is becomes zero/positive. During this interval both the charge circuit 2114 and the discharge circuit 2102 are enabled, thereby charging the capacitor CT with a current proportional to I2−I1;
- at the instant when the signal Vs indicates that the resonant current Is become positive, disabling the charge circuit 2114 (via the signal S1), thereby discharging the capacitor CT with a current proportional to I1 (and consequently to Ic), and

- once the integration signal (voltage $V_{CT}$ at the capacitor CT) reaches the lower threshold value $V_z$, as signaled, e.g., via a falling edge of the signal S4, enabling again the charge circuit 2114 (via the signal S1) and ending the interval TB, thereby ending the interval Δt1 and starting the interval TA.

Specifically, during each of the semi-periods TA or TB, the control circuit 2106 is configured to:

- once the respective semi-period is started, e.g., in response to an edge of the signal S4, waiting for the signal Vs to indicate that the resonant current Is changes sign, i.e., become positive or negative;
- at the instant when the signal Vs indicates that the resonant current Is has changed sign, disabling the charge circuit 2114, thereby discharging the capacitor CT with a current proportional to I1, and
- once the integration signal INT (voltage $V_{CT}$ at the capacitor CT) reaches the lower threshold value $V_z$, e.g., in response to the immediately following edge of the signal S4, enabling again the charge circuit 2114 and ending the respective semi-period, thereby starting the following semi-period (TB or TA).

In parallel the control circuit 2106 may:

- once the interval TA is started, e.g., in response to a falling edge of the signal S4, setting the signal LSGD to high after a period Td, thereby switching the low-side switch SW2 on, and at the end of the interval TA, e.g., in response to a rising edge of the signal S4, setting contemporaneously the signal LSGD to low, thereby switching the low-side switch SW2 off,
- once the interval TB is started, e.g., in response to a rising edge of the signal S4, setting the signal HSGD to high after a period Td, thereby switching the high-side switch SW1 on, and at the end of the interval TB, e.g., in response to a falling edge of the signal S4, setting contemporaneously the signal HSGD to low, thereby switching the high-side switch SW1 off.

Figure 7:
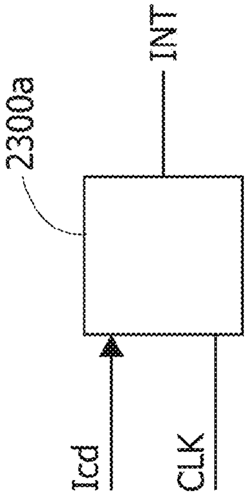

In various embodiments, one or more of the above analog circuits may also be implemented in digital. For example, as shown in FIG. 7, the analog integrator/ramp generator 2300 may be replaced with a digital counter configured to receive (e.g. via an analog-to-digital converter) a digital sample Icd of the current Ic, wherein the counter 2300*a* is a bidirectional counter counting at a speed proportional to the current I2−I1 while counting up, and at a speed proportional to I1 while counting down. For example, the "counting speed" of a counter may be controlled by varying the step size/increment value of the counter and/or the frequency of the clock signal CLK used by the counter. Accordingly, in this case, also the circuit 2110 may be replaced with a corresponding digital circuit configured to compare the digital ramp signal provided by the counter 2300*a* with a digital value indicative of the threshold $V_z$. For example, the circuits 2300*a* and 2110 may be implemented with a microprocessor programmed via software instructions. Similarly, also the circuit shown in FIG. 6 (or the complete circuit 2112) could be implemented via software instructions. Accordingly, since modem microcontrollers often include an analog-to-digital converter and an analog comparator, the circuits 2106 and 2300*a* may be implemented with a microcontroller.

As mentioned before, FIG. 5 shows time diagrams of the voltages involved in the device of FIG. 4.

The first diagrams of FIG. 5 show the behavior of the tank voltage $V_{HB}$ (dashed line) and the behavior of the voltage Vs indicative of (for instance, proportional to) the current Is flowing through the resonant tank (continuous line).

As previously described, in various embodiments, the control signal S4 may be set to a first logic level (for instance, to low) when the voltage $V_{CT}$ reaches the lower threshold $V_z$ and the control signal S4 was previously set to the other logic level (for instance, to high), and to a second logic level (for instance, to high) when the voltage $V_{CT}$ reaches such lower threshold $V_z$ and the control signal S4 was previously set to the first logic level (for instance, to low), i.e., the logic value of the signal S4 is inverted each time the voltage $V_{CT}$ reaches the threshold $V_z$. In various embodiments, the control signal S4 may be set to low, as the first logic level, and to high, as the second logic level (for instance, as shown in FIG. 5). In other embodiments, the control signal S4 may be set to high, as the first logic level, and to low, as the second logic level.

As previously described, in various embodiments, the control signal S3 indicates whether the signal Vs (corresponding to the resonant current Is) is positive or negative.

In various embodiments, the control signal S3 may be set to high when the signal Vs (corresponding to the resonant current Is) is positive (for instance, as shown in FIG. 5). In other embodiments, the control signal S3 may be set to low when the signal Vs (corresponding to the resonant current Is) is positive.

The signal S1 is set according to the values of the control signals S3 and S4 by the circuit 2112. For example, in various embodiments, the circuit 2112 is configured to:

- set to a high logic level the signal S1, if the signal S3 is set to the low logic level and the signal S4 is set to the high logic level, or if the signal S3 is set to the high logic level and the signal S4 is set to the low logic level. Otherwise, the signal S1 is set to a low logic level. Such configuration is used if the control signal S4 is be set to low, as the first logic level, and to high, as the second logic level and the control signal S3 is set to high when the signal Is is positive (this case is shown in FIG. 5), or if the control signal S4 is be set to high, as the first logic level, and to low, as the second logic level and the control signal S3 is set to low when the signal Is is positive.
- set to a high logic level the signal S1, if the signal S3 is set to the low logic level and the signal S4 is set to the low logic level, or if the signal S3 is set to the high logic level and the signal S4 is set to the high logic level. Otherwise, the signal S1 is set to a low logic level. Such configuration is used if the control signal S4 is be set to high, as the first logic level, and to low, as the second logic level and the control signal S3 is set to high when the signal Is is positive, or if the control signal S4 is be set to low, as the first logic level, and to high, as the second logic level and the control signal S3 is set to low when the signal Is is positive.

As previously described, when the control signal S1 is asserted/set to the high level, the charge circuit 2114 is enabled by the circuit 2112, and the capacitor CT is charged by a current proportional to I2−I1. In fact, the control signal S1 is set in the period between the instant when a respective semi-period TA/TB is started and the instant when the signal Vs indicates that the resonant current Is has changed sign. In this period, the capacitor CT is charged with the (constant) current I2=Io from the charge circuit 2114, and is discharged with a current I1 proportional to the current Ic, for instance, I1=k·Ic, by the discharge circuit 2102. This results overall in a charging of the capacitor CT and in a consequent rising of the voltage $V_{CT}$ at the capacitor, from a value substantially equal to or smaller than the lower threshold value $V_z$ to a value close to the amplitude of the ascending ramp $$\Delta V_{CT}^{+}.$$

Similarly, when the control signal S1 is de-asserted/set to the low logic level, the charge circuit 2114 is disabled by the circuit 2112, and the capacitor CT is discharged by a current proportional to I1, and thus to Ic. In fact, the control signal S1 is not set in the period between the instant when the signal Vs indicates that the resonant current Is has changed sign and the instant when the respective semi-period TA/TB ends. In this period, the capacitor CT is discharged with a current I1 proportional to the current Ic, for instance, I1=k·Ic, by the discharge circuit 2102, with a consequent lowering of the voltage $V_{CT}$ at the capacitor CT, from a value close to the amplitude of the descending ramp $$\Delta V_{CT}^{-},$$

that is substantially equal to the amplitude of the ascending ramp $$\Delta V_{CT}^{+},$$

to a value substantially equal to or smaller than the lower threshold value $V_z$.

FIG. 5 also shows a further embodiment, wherein the threshold value $V_z$ is not constant, but the driver circuit 210 is configured to:

- increases the threshold value $V_z$ with a (constant) slope $P_3$; and
- reset the threshold value $V_z$ in response to detecting the beginning of the next semi-period, e.g., in response to each edge in the signal S4, i.e., each time the voltage $V_{CT}$ is equal to or smaller than the threshold value $V_z$.

The behavior of signals HSGD and LSGD has already been described in detail previously, thus, its description will not be repeated to not overburden the present description.

Figure 8:
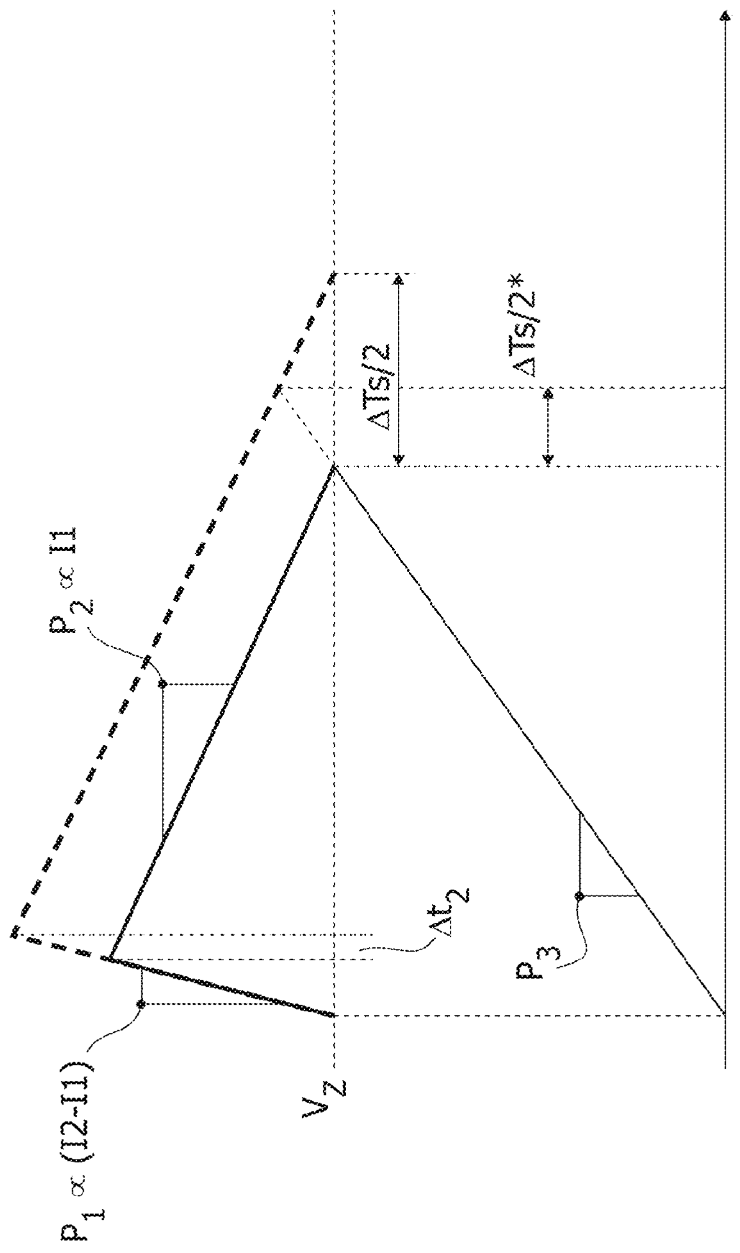
FIG. 8 shows an example of a specific type of disturbance amplification solved by an embodiment of the present solution.

FIG. 8 shows an example of a specific type of disturbance amplification affecting the behavior of the voltage $V_{CT}$ that is solved by an embodiment of the present solution.

FIG. 8 shows both the behavior of the voltage $V_{CT}$ during a given semi-period $$\frac{T_s}{2},$$

i.e., TA or TB, such voltage $V_{CT}$ having a triangular waveform due to the charging (i.e., with a current proportional to I2–I1) and discharging (i.e., with a current proportional to I1, and thus to Ic) of the capacitor CT (dashed line in FIG. 8) and the behavior of an example of the voltage $V_{CT}$ affected by a disturbance (continuous line) during the same semi-period $$\frac{T_s}{2}.$$

Specifically, if the lower threshold value $V_z$ is a constant voltage value and if the disturbance affecting the voltage $V_{CT}$ is due to an alteration of the duty cycle of the signal S1, for instance, a modification of the time where the control signal S1 should be set to the high logic level, i.e., $\Delta T_z$, the effect on the voltage $V_{CT}$ is a reduction of the considered semi-period $$\frac{T_s}{2}$$

of a quantity equal to $$\Delta\frac{T_s}{2}.$$

Such quantity $$\Delta\frac{T_s}{2}$$

is larger than the quantity of the original alteration of the duty cycle of the signal S1, i.e., $\Delta T_z$, thus, the original alteration is amplified when propagated to the voltage $V_{CT}$.

In fact, if the lower threshold value $V_z$ is a constant voltage value, any variation in the duty cycle of the signal S1, for instance, the modification of the time where the control signal S1 should be set to the high logic level, i.e., $\Delta T_z$, causes a variation of the semi-periods $$\frac{T_s}{2},$$

i.e., TA and/or TB of a quantity equal to:

$$\Delta\frac{T_s}{2} = \left(1 + \frac{P_1}{|P_2|}\right)\Delta T_z = \frac{T_s}{2T_z}\Delta T_z$$

wherein $$\frac{T_s}{2T_z}\Delta T_z > \Delta T_z$$

where $P_1$ and $P_2$ are the slope of the sides of the triangular waveform of the voltage $V_{CT}$ during the charging and discharging phases respectively. Therefore, the slope $P_1$ is proportional to the charging current I2–I1 and the slope $P_2$ is proportional to the discharging current I1, and thus to Ic.

Therefore, any variation in the duty cycle of the signal S1, for instance, the modification of the time where the control signal S1 should be set to the high logic level, i.e., $\Delta T_z$, is amplified and causes a deviation of the duty cycle of the half bridge from the desired value of 50%, specifically, the duty cycle of the square wave voltage $V_{HB}$ deviate from 50% of a quantity equal to $$\Delta\frac{T_s}{2},$$

with consequent asymmetries on the primary side of the circuit and, as a consequence, different secondary currents flowing in the secondary side.

In various embodiments, to avoid (or at least reduce) the amplification of this type of disturbances and to maintain the symmetry of the circuit, the voltage $V_{CT}$ at the capacitor CT is compared with a lower threshold value $V_z$ that is a ramp with slope $P_3$, synchronized to the switching, i.e., whose value is reset to an initial value, for instance, to a ground value GND3, at the beginning of each semi-period TA and/or TB. Therefore, such voltage $V_{CT}$ at the capacitor CT is considered as substantially equal to or smaller than the lower ramp threshold value $V_z$ with slope $P_3$ when a descending part of the voltage $V_{CT}$ at the capacitor CT intersects such lower ramp threshold value $V_z$ with slope $P_3$.

In this case, the variation of the semi-periods TA and/or TB, i.e., $$\Delta\frac{T_s}{2},$$

can be reformulated as:

$$\Delta\frac{T_s}{2} = \left(\frac{P_1 + |P_2|}{P_3 + |P_2|}\right)\Delta T_z$$

wherein $$\left(\frac{P_1 + |P_2|}{P_3 + |P_2|}\right)\Delta T_z < \Delta T_z \text{ if } P_3 > P_1$$

Hence, the variation of the semi-periods TA and/or TB, i.e., $$\Delta\frac{T_s}{2},$$

depends on the slope $P_3$, and so, by choosing a slope $P_3$ with a value larger than the value of the slope $P_1$, proportional to the current I1, it is possible to reduce or even substantially remove the impact of this type of disturbances on the duty cycle of the half bridge and on the symmetries of the circuit.

Note that FIG. 6 shows a mitigating effect using a lower ramp threshold value $V_z$ with a slope $P_3$ that does not satisfy the condition $P_3 > P_1$. Therefore, even by using a lower ramp threshold value $V_z$ with a slope $P_3$ with a value that is smaller than the value of the slope $P_1$, it is possible to have a resulting variation of the semi-periods TA and/or TB of a quantity $$\Delta\frac{T_s^*}{2}$$

that is significantly smaller than the variation of the semi-periods TA and/or $$TB\,\Delta\frac{T_s}{2},$$

i.e., the variation obtained considering a constant lower threshold value $V_z$, thus, obtaining also in this case a mitigating effect on the undesired variation of the semi-periods TA and/or TB.

Hence, by satisfying the condition $P_3 > P_1$, it is possible to reduce the resulting variation of the semi-periods TA and/or TB of a quantity $$\Delta\frac{T_s^*}{2}$$

that is further reduced if compared with the reduction obtained with a value of the slope $P_3$ that is smaller than the value of the slope $P_1$. In various embodiments, by satisfying the condition $P_3 > P_1$, it is possible to have a resulting variation of the semi-periods TA and/or TB of a quantity $$\Delta\frac{T_s^*}{2}$$

that may even be negligible if compared with the length of the semi-periods TA and/or TB.

Moreover, both the lower ramp threshold value $V_z$ and the value of the slope $P_3$ do not affect the accuracy of the control law for such current representative of the feedback loop Ic used for ensuring the steady state condition in charging and discharging the capacitor CT in subsequent cycles.

In variant embodiments, the lower ramp threshold value $V_z$ may not start simultaneously with the commutation of the half bridge (as shown in FIG. 8), but may start after a fixed delay, for instance, equal to the delay $T_d$ wherein both the switches SW1 and SW2 are opened. Delaying the starting of the lower ramp threshold value $V_z$ may have the technical effect of allowing the use of larger values of the slope $P_3$ without increasing the resulting end value of the lower ramp threshold value $V_z$. Such technical effect may be of interest for increasing the value of the slope $P_3$ without a consequent increase in the resulting end value of the lower ramp threshold value $V_z$, since if the resulting end value of the lower ramp threshold value $V_z$ is too large, i.e., if the maximum value, i.e., the peak, reached by the lower ramp threshold value $V_z$ is too high, maximum dynamics of the circuits are reached and the resulting lower ramp threshold value $V_z$ will be distorted.

In variant embodiments, the lower ramp threshold value $V_z$ may have a two-slope behavior. For instance, the lower ramp threshold value $V_z$ may have a first slope, for instance, greater than zero, during the time interval $T_z$ and a second slope, for instance, with a value that is higher than the value of such first slope, during the remaining part of the half switching period $$\frac{T_s}{2} - T_z.$$

Specifically, the modification of the ratio between the first slope and the second slope of the lower ramp threshold value $V_z$ may modify the dynamic behavior of the circuit. For instance, if such ratio is increased, the response to control step-changes tends to be more overdamped. Note that if the lower ramp threshold value $V_z$ has a two-slope behavior, it is desirable that the average slope $P_{avg}$ of the first slope and the second slope of the lower ramp threshold value $V_z$ satisfies the condition:

$$P_{avg} > P_1$$

Note that in variant embodiments of the present solution, the lower ramp threshold value $V_z$ may be realized with a resettable up counter clocked at a speed higher than that used by the bidirectional counter while counting up.

Figure 9:
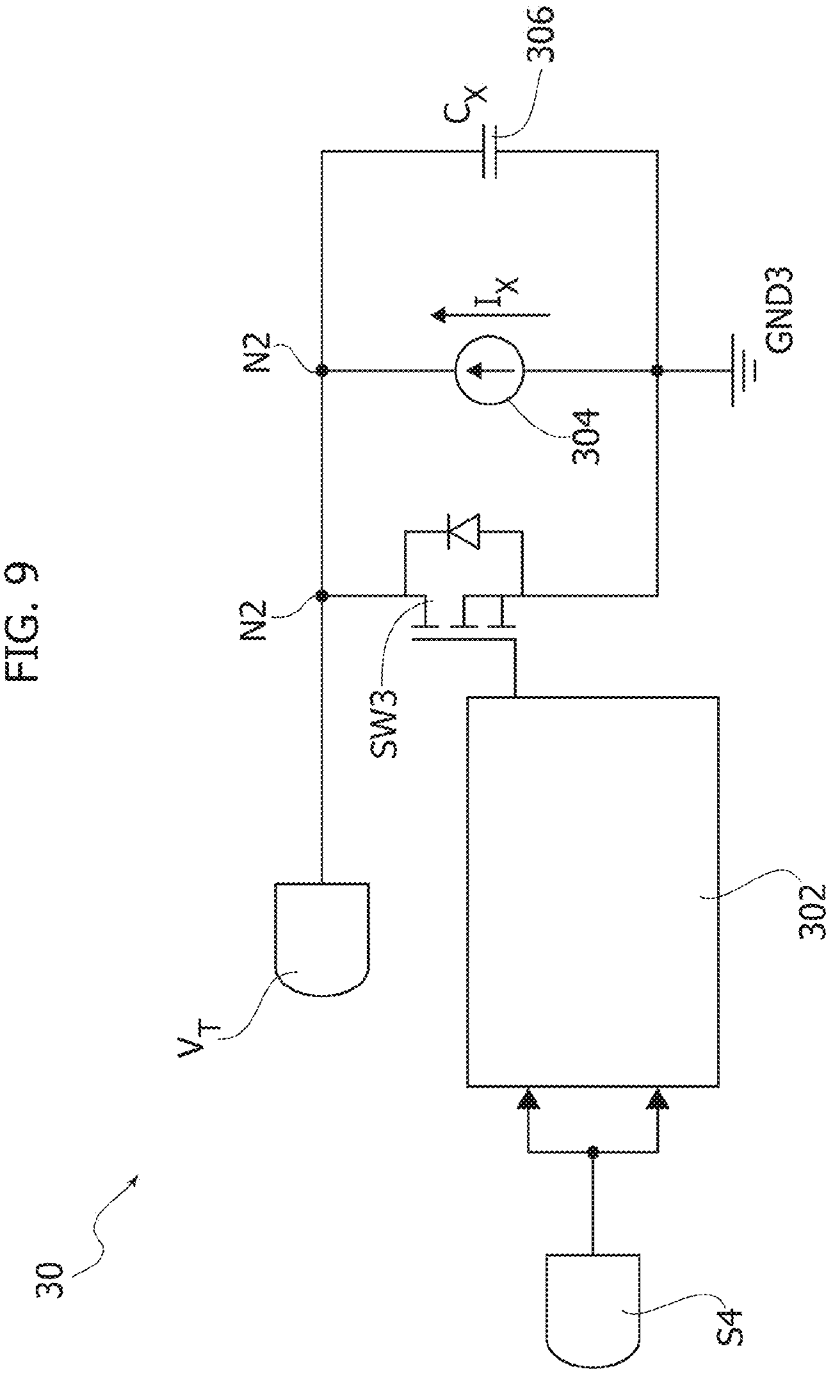
FIG. 9 shows an example of a circuit that can be used to generate a lower ramp threshold value, according to embodiments of the present solution.

FIG. 9 shows an example of a circuit 30 that can be used to generate such lower threshold value $V_z$ as a ramp with slope $P_3$.

The circuit 30 is configured to receive the control signal S4, i.e., a pulse width modulated (PWM) control signal that changes its state when the voltage $V_{CT}$ reaches the lower threshold $V_z$, and to provide to the second comparator block 2110 the lower ramp threshold value $V_z$ with a slope $P_3$.

The input control signal S4 is provided to a control block 302 configured to output a control signal, for instance, when a change/edge in the logical input S4 is detected, i.e., on both rising and falling edges.

Such control block 302 is coupled to the gate terminal of a third electronic switch SW3, such as FET, such as n-channel FET, for instance, NMOS, that has its drain terminal coupled to an output node N2 and its source terminal coupled to a ground GND3.

Between the same nodes, i.e., between the output node N2 and the ground GND3, are coupled, i.e., in parallel to the third switch SW3, a current generator 304, which is configured to generate a current of a value equal to $I_x$, and a capacitor $C_x$ 306.

Thus, during the time where the control signal S4 is constant, i.e., does not change its state, the third switch SW3 is open so that the current $I_x$ generated by the current generator 304 may charge the capacitor $C_x$ 306, causing a rise, i.e., a ramp, in the voltage of the output node N2, that is the lower ramp threshold value $V_z$, that is proportional to the value of the current $I_x$.

Conversely, when a change of state is detected in the signal S4 by the control block 302, the third switch SW3 is closed, connecting the output node N2 to the ground GND3, thus resetting the value of the lower threshold $V_z$ and discharging the capacitor $C_x$ 306 to the ground GND3 value.

To effectively reduce the previously discussed amplification of disturbances, in various embodiments, the value of the slope of such ramp $P_3$ should preferably be higher than the value of the slope $P_1$ of the triangular waveform of the voltage $V_{CT}$ during the charging phase of the capacitor CT. In fact, the slope $P_3$ of the lower ramp threshold value $V_z$ may not be critical, provided that the disturbance attenuation condition $P_3>P_1$ is satisfied.

Therefore, it is desirable to satisfy:

$$P_3 = \frac{I_x}{C_x} \text{ with } \frac{I_x}{C_x} > \frac{I2 - I1}{CT}$$

In this solution, the value of the current $I_x$ does not need to be tightly matched to the value of the current I2, but it is sufficient that such current $I_x$ is larger than a minimum value. In addition, also the capacitor $C_x$ does not need to be tightly matched to the value of the capacitor CT, therefore, avoiding additional trimming of the components and larger die sizes, thus, resulting in an overall less complex control circuit that consumes less silicon.

In various embodiments, both the currents $I_x$ and I2 may be internally fixed or externally programmable via a dedicated pin, for instance, by providing a reference voltage and an external resistor and/or a current mirror with appropriate transfer ratios.

Therefore, it can be understood how the solution as described herein facilitates obtaining a simple PSC control device that has a current representative of the feedback loop Ic that is not dependent on circuit components and on their tolerances and that still maintains a low sensitivity to the input voltage offset of the zero-current comparator and/or to perturbations that tend to alter the duty cycle of the generated square-wave from 50%, thus, resulting in simpler and less critical resonant converters, where trimming of components can be simplified and with smaller die sizes.

Without prejudice to the underlying principles, the details and the embodiments may vary, even significantly, with respect to what has been described by way of example only without departing from the scope of the embodiments.

In one embodiment, a driver circuit (210) for a resonant converter (20) is configured to generate an output voltage (Vout) or output current (Iout) at two output terminals (202*a*, 202*b*) from an input voltage (Vin) applied to a positive (200*a*) and a negative (200*b*) input terminal. The driver circuit (210) includes a first and a second terminal configured to be connected to control terminals of a high-side electronic switch (SW1) and a low-side electronic switch (SW2) of the resonant converter (20) in order to drive the high-side electronic switch (SW1) and the low-side electronic switch via respective drive signals (HSGD, LSGD), a third terminal configured to be connected to a current sensor (222) in order to receive a signal (Vs) proportional to a resonant current (Is) flowing from a switching node (HB) between the high-side electronic switch (SW1) and the low-side electronic switch to a resonant tank, rectifier and filter circuit (204) of the resonant converter (20), a fourth terminal configured to be connected to a feedback circuit (212-218) in order to receive a feedback signal (Ic) determined as a function of the output voltage (Vout) or the output current (Iout), an analog zero current comparator (2108) configured to generate a first control signal (S3) indicating when the resonant current (Is) changes sign as a function of the signal (Vs) received at the third terminal, a triangular wave generator circuit (2300; 2300*a*) configured to provide at output a triangular signal (INT), and a comparison circuit (2110) configured to generate a second control signal (S4) indicating whether the triangular signal (INT) reaches a reference threshold ($V_z$); wherein the driver circuit (210) is configured to: drive the high-side (SW1) and the low-side (SW2) electronic switch via the drive signals (HSGD, LSGD) during a first (TB) and a second (TA) consecutive switching semi-period, wherein each of the first (TB) and the second (TA) switching semi-period ends when the comparison circuit (2110) indicates that the triangular signal (INT) has reached the reference threshold ($V_z$), once the first switching semi-period (TB) is started, open the low-side electronic switch (SW2), and close the high-side electronic switch (SW1) after a first delay (Td), and once the second switching semi-period (TA) is started, open the high-side electronic switch (SW1), and close the low-side electronic switch (SW2) after a second delay (Td); wherein the triangular wave generator circuit (2300) is configured to generate the triangular signal (INT) in each of the first (TB) and the second (TA) switching semi-period by: in a first interval ($T_z$) starting at the instant when the respective semi-period (TA, TB) starts and ending at the instant when the first control signal (S3) indicates that the resonant current (Is) has changed sign, increasing the triangular signal (INT) with a first slope (I2–I1), and in a second interval starting at the instant when the first control signal (S3) indicates that the resonant current (Is) has changed sign and ending at the instant when the second control signal (S4) indicates that the triangular signal (INT) has reached the reference threshold ($V_z$), decreasing the triangular signal (INT) with a second slope (–I1); wherein the first slope (I2−I1) has a positive value obtained by summing a negative first value (−I1) to a positive second value (I2), and the second slope (−I1) has a negative value corresponding to the first negative value (−I1), wherein the absolute value of the first value (−I1) is smaller than the absolute value of the second value (I2) and the first value (−I1) is proportional to the feedback signal (Ic).

The triangular wave generator circuit (2300; 2300*a*) may include an integrator circuit configured to generate the triangular signal (INT) by integrating: —during the first interval ($T_z$), the sum of the positive second value (I2) and the negative first value (−I1), and during the second interval, the negative first value (−I1).

The integrator circuit may include: an integration capacitor (CT) connected to a node (N1); a first current source (2302) configured to sink a first current corresponding to the first value (−I1) from the node (N1); and a second current source (2306) configured to source a second current corresponding to the second value (I2) to the node (N1), wherein the second current source (2306) may be enabled during the first interval ($T_z$).

The driver circuit may include a control circuit (2106) configured to: assert a third control signal (S1) in response to determining that the second control signal (S4) indicates that the triangular signal (INT) reaches a reference threshold ($V_z$); de-assert the third control signal (S1) in response to determining that the first control signal (S3) indicates that the resonant current (Is) changes sign; wherein the second current source (2306) may be enabled when the third control signal (S1) is asserted.

The triangular wave generator circuit (2300) may include a bidirectional counter configured to: during the first interval ($T_z$), increase a count value with a speed proportional to the sum of the positive second value (I2) and the negative first value (−I1), and during the second interval, decrease the count value with a speed proportional to the negative first value (−I1).

The reference threshold ($V_z$) may be a ramp with a positive slope that starts at the beginning of the first (TB) and of the second (TA) switching semi-period, or that starts after a fixed delay (Td) from the beginning of the first (TB) and of the second (TA) switching semi-period, and the ramp may be reset at the end of the first (TB) and of the second (TA) switching semi-period.

The ramp reference threshold ($V_z$) may have a slope ($P_3$) being greater than the first slope (I2−I1); or the ramp reference threshold ($V_z$) may have a first slope during the first interval ($T_z$) and a second slope during the second interval, wherein the second slope may be greater than the first slope, and wherein an average value ($P_{avg}$) of the first slope and the second slope of the ramp reference threshold ($V_z$) may be greater than the first slope (I2−I1).

The ramp reference threshold ($V_z$) may be generated by a threshold generating circuit (30) configured to receive the second control signal (S4), and may include: a control block (302) configured to generate a control signal indicating a change in the reference signal (S4); a third switch (SW3) coupled between an output node and a ground node (GND3); a third current generator (304) coupled between the output node and the ground node (GND3) and configured to generate a third current ($I_x$); and a second capacitor ($C_x$, 306) coupled between the output node and the ground node (GND3); wherein the control block (302) may be configured to: close the third switch (SW3) when the control signal may indicate a change in the reference signal (S4); and open the third switch (SW3) when the control signal may not indicate a change in the reference signal (S4).

The third current ($I_x$) may be larger than a threshold obtained as a function of the first value (I1), the second value (I2), the capacitance of the integration capacitor (CT), and the capacitance of the second capacitor ($C_x$, 306).

In one embodiment, an integrated circuit includes a driver circuit (210), wherein the first, second, third and fourth terminal of the driver circuit (210) are connected to respective pins of the integrated circuit.

In one embodiment, an electronic converter includes a positive (200*a*) and a negative (200*b*) input terminal; two output terminals (202*a*, 202*b*) for providing an output voltage (Vout) or output current (Iout); at least one half-bridge including a high-side (SW1) and a low-side (SW2) electronic switch connected in series between the positive (200*a*) and the negative (200*b*) input terminals, wherein the intermediate node between the high-side (SW1) and the low-side (SW2) electronic switch represents a switching node (HB); a resonant tank, rectifier and filter circuit (204) connected between the switching node (HB) and the two output terminals (202*a*, 202*b*); a current sensor (222) configured to generate a signal (Vs) proportional to the resonant current (Is) flowing from the switching node (HB) to the resonant tank, rectifier and filter circuit (204); a feedback circuit (212-218) configured to generate a feedback signal (Ic) determined as a function of the output voltage (Vout) or the output current (Iout); and a driver circuit (210) according to any of the previous claims 1 to 10.

The resonant tank, rectifier and filter circuit (204) may include: a transformer (T) including a primary winding (T1) and a secondary winding (T2); a capacitor (Cr) and a first inductance (Ls) connected in series with the primary winding (T1) between the switching node (HB) and the positive (200*a*) or the negative (200*b*) input terminal; a second inductance (Lp) connected in parallel with the primary winding (T1); a rectifier circuit (D1, D2) connected between the secondary winding (T2) and the two output terminals (202*a*, 202*b*).

In one embodiment, a method of operating an electronic converter includes driving the high-side (SW1) and the low-side (SW2) electronic switch via the drive signals (HSGD, LSGD) during a first (TB) and a second (TA) consecutive switching semi-period, wherein each of the first (TB) and the second (TA) switching semi-period ends when a triangular signal (INT) has reached a reference threshold ($V_z$), once the first switching semi-period (TB) is started, opening the low-side electronic switch (SW2), and closing the high-side electronic switch (SW1) after a first delay (Td), and once the second switching semi-period (TA) is started, opening the high-side electronic switch (SW1), and closing the low-side electronic switch (SW2) after a second delay (Td); and generating the triangular signal (INT) in each of the first (TB) and the second (TA) switching semi-period by: in a first interval ($T_z$) starting at the instant when the respective semi-period (TA, TB) starts and ending at the instant when the resonant current (Is) has changed sign, increasing the triangular signal (INT) with a first slope (I2−I1), and in a second interval starting at the instant when the resonant current (Is) has changed sign and ending at the instant when the triangular signal (INT) has reached the reference threshold ($V_z$), decreasing the triangular signal (INT) with a second slope (−I1); wherein the first slope (I2−I1) has a positive value obtained by summing a negative first value (−I1) to a positive second value (I2), and the second slope (−I1) has a negative value corresponding to the first negative value (−I1), wherein the absolute value of the first value (−I1) is smaller than the absolute value of the second value (I2) and the first value (−I1) is proportional to the feedback signal (Ic).

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A driver circuit for a resonant converter, comprising:

a first terminal configured to output a high-side gate drive signal to a high-side electronic switch of the resonant converter;

a second terminal configured to output a low-side gate drive signal to a low-side electronic switch of the resonant converter;

a third terminal configured to receive a signal proportional to a resonant current flowing in a primary side of the resonant converter;

a fourth terminal configured to receive a feedback signal based on an output voltage or an output current of the resonant converter;

an analog zero current comparator configured to generate a first control signal indicating when the resonant current changes sign as a function of the signal received at the third terminal, a triangular wave generator circuit configured to provide a triangular signal; and a comparison circuit configured to generate a second control signal indicating whether the triangular signal reaches a reference threshold;

wherein the driver circuit is configured to:

drive the high-side and the low-side electronic switch via the high-side and low-side gate drive signals during a first and a second consecutive switching semi-period, wherein each of the first and the second switching semi-period ends when the comparison circuit indicates that the triangular signal has reached the reference threshold, once the first switching semi-period is started, open the low-side electronic switch, and close the high-side electronic switch after a first delay, and once the second switching semi-period is started, open the high-side electronic switch, and close the low-side electronic switch after a second delay;

wherein the triangular wave generator circuit is configured to generate the triangular signal in each of the first and the second switching semi-period by:

in a first interval starting at the instant when the respective semi-period starts and ending at the instant when the first control signal indicates that the resonant current has changed sign, increasing the triangular signal with a first slope, and in a second interval starting at the instant when the first control signal indicates that the resonant current has changed sign and ending at the instant when the second control signal indicates that the triangular signal has reached the reference threshold, decreasing the triangular signal with a second slope;

wherein the first slope has a positive value obtained by summing a negative first value to a positive second value, and the second slope has a negative value corresponding to the first negative value, wherein the absolute value of the first value is smaller than the absolute value of the second value and the first value is proportional to the feedback signal.

2. The driver circuit according to claim 1, wherein the triangular wave generator circuit comprises an integrator circuit configured to generate the triangular signal by integrating:

during the first interval, the sum of the positive second value and the negative first value, and during the second interval, the negative first value.

3. The driver circuit according to claim 2, wherein the integrator circuit includes:

an integration capacitor connected to a node;

a first current source configured to sink a first current corresponding to the first value from the node; and a second current source configured to source a second current corresponding to the second value to the node, wherein the second current source is enabled during the first interval.

4. The driver circuit according to claim 3, wherein the driver circuit includes a control circuit configured to:

assert a third control signal in response to determining that the second control signal indicates that the triangular signal reaches a reference threshold;

de-assert the third control signal in response to determining that the first control signal indicates that the resonant current changes sign;

wherein the second current source is enabled when the third control signal is asserted.

5. The driver circuit according to claim 2, wherein the triangular wave generator circuit comprises a bidirectional counter configured to:

during the first interval, increase a count value with a speed proportional to the sum of the positive second value and the negative first value, and during the second interval, decrease the count value with a speed proportional to the negative first value.

6. The driver circuit according to claim 1, wherein the reference threshold is a ramp with a positive slope that starts at the beginning of the first and of the second switching semi-period, or that starts after a fixed delay from the beginning of the first and of the second switching semi-period, and wherein the ramp is reset at the end of the first and of the second switching semi-period.

7. The driver circuit according to claim 6, wherein:

the ramp reference threshold has a slope being greater than the first slope; or the ramp reference threshold has a first slope during the first interval and a second slope during the second interval, wherein the second slope is greater than the first slope, and wherein an average value of the first slope and the second slope of the ramp reference threshold is greater than the first slope.

8. The driver circuit according to claim 6, wherein the ramp reference threshold is generated by a threshold generating circuit configured to receive the second control signal, and includes:

a control block configured to generate a control signal indicating a change in the reference signal;

a third switch coupled between an output node and a ground node;

a third current generator coupled between the output node and the ground node and configured to generate a third current; and a second capacitor coupled between the output node and the ground node;

wherein the control block is configured to:

close the third switch when the control signal indicates a change in the reference signal; and open the third switch when the control signal do not indicate a change in the reference signal.

9. The driver circuit according to claim 8, wherein the third current is larger than a threshold obtained as a function of the first value, the second value, the capacitance of the integration capacitor, and the capacitance of the second capacitor.

10. The driver circuit according to claim 1, wherein driver circuit is an integrated circuit, wherein the first, second, third and fourth terminal of the driver circuit are connected to respective pins of the integrated circuit.

11. A device, comprising:

a driver circuit including:

a first terminal configured to output a high-side gate drive signal;

a second terminal configured to output a low-side gate drive signal;

a third terminal configured to receive a resonant current signal indicative of a resonant current external to the driver circuit;

a fourth terminal configured to receive a feedback signal based on an output signal external to the driver circuit;

an integrator circuit to generate a triangular integration signal based on the feedback signal; and a control circuit configured to receive the integration signal and the resonant current signal and to generate the high-side gate drive signal and the low-side gate drive signal based on the integration signal and the resonant current signal, wherein the integrator circuit is configured to generate the triangular integration signal with a first slope during a first interval and with a second slope during a second interval, wherein the first slope has a positive value obtained by summing a negative first value to a positive second value, and the second slope has a negative value corresponding to the first negative value, wherein the absolute value of the first value is smaller than the absolute value of the second value and the first value is proportional to the feedback signal.

12. The device of claim 11, comprising an electronic converter, the electronic converter including:

a positive input terminal and a negative input terminal;

two output terminals for providing the output signal, wherein the output signal is either an output voltage or output current;

at least one half-bridge including a high-side electronic switch and a low-side electronic switch connected in series between the positive input terminal and the negative input terminals, wherein an intermediate node between the high-side and the low-side electronic switch is a switching node, wherein the high-side electronic switch includes a gate terminal that receives the high-side gate drive signal, wherein the low-side electronic switch includes a gate terminal that receives the low-side gate drive signal.

13. The device of claim 12, wherein the electronic converter includes:

a resonant tank, rectifier and filter circuit connected between the switching node and the two output terminals, wherein the resonant current flows from the switching node to the resonant tank, rectifier and filter circuit;

a current sensor configured to generate the resonant current signal proportional to the resonant current;

a feedback circuit configured to generate the feedback signal as a function of the output signal.

14. The device of claim 13, wherein the resonant tank, rectifier and filter circuit comprises:

a transformer comprising a primary winding and a secondary winding;

a capacitor and a first inductance connected in series with the primary winding between the switching node and the positive or the negative input terminal;

a second inductance connected in parallel with the primary winding; and a rectifier circuit connected between the secondary winding and the two output terminals.

15. The device of claim 14, wherein the driver circuit is configured to:

drive the high-side and the low-side electronic switch via the high-side and low-side gate drive signals during a first and a second consecutive switching semi-period, wherein each of the first and the second switching semi-period ends when the comparison circuit indicates that the triangular signal has reached the reference threshold;

once the first switching semi-period is started, open the low-side electronic switch, and close the high-side electronic switch after a first delay; and once the second switching semi-period is started, open the high-side electronic switch, and close the low-side electronic switch after a second delay.

16. The device of claim 15, wherein the integrator circuit is configured to generate the triangular integration signal in each of the first and the second switching semi-period by:

in a first interval starting at the instant when the respective semi-period starts and ending at the instant when the first control signal indicates that the resonant current has changed sign, increasing the triangular signal with the first slope; and in a second interval starting at the instant when the first control signal indicates that the resonant current has changed sign and ending at the instant when the second control signal indicates that the triangular signal has reached the reference threshold, decreasing the triangular signal with the second slope.

17. The device of claim 12, wherein the control circuit includes:

an analog zero current comparator configured to generate a first control signal indicating when the resonant current changes sign as a function of the signal received at the third terminal; and a comparison circuit configured to generate a second control signal indicating whether the triangular signal reaches a reference threshold, wherein the control circuit is configured to generate the high-side gate drive signal and the low-side gate drive signal based on the first control signal and the second control signal.

18. A method, comprising:

driving, with a driver circuit of a resonant converter, a high-side switch of the resonant converter with a high-side gate drive signal;

driving, with the driver circuit, a low-side switch of the resonant converter with a low-side gate drive signal;

receiving, with the driver circuit, a resonant current signal indicative of a resonant current in a primary side of the resonant converter;

receiving, with the driver circuit, a feedback signal based on an output signal of the resonant converter;

generating, with an integrator circuit of the driver circuit, a triangular integration signal based on the feedback signal; and generating, with the driver circuit, the high-side gate drive signal and the low-side gate drive signal based on the integration signal and the resonant current signal, wherein generating the triangular integration signal includes generating the triangular integration signal with a first slope during a first interval and with a second slope during a second interval, wherein the first slope has a positive value obtained by summing a negative first value to a positive second value, and the second slope has a negative value corresponding to the first negative value, wherein the absolute value of the first value is smaller than the absolute value of the second value and the first value is proportional to the feedback signal.

19. The method of claim 18, comprising:

driving the high-side and the low-side electronic switch via the drive signals during a first and a second consecutive switching semi-period, wherein each of the first and the second switching semi-period ends when the triangular integration signal has reached a reference threshold;

once the first switching semi-period is started, opening the low-side electronic switch, and closing the high-side electronic switch after a first delay; and once the second switching semi-period is started, opening the high-side electronic switch, and closing the low-side electronic switch after a second delay.

20. The method of claim 19, comprising:

generating the triangular integration signal in each of the first and the second switching semi-period by:

in the first interval starting at the instant when the respective semi-period starts and ending at the instant when the resonant current has changed sign, increasing the triangular integration signal with the first slope; and in the second interval starting at the instant when the resonant current has changed sign and ending at the instant when the triangular integration signal has reached the reference threshold, decreasing the triangular signal with the second slope.

* * * * *